(12) United States Patent
Yamada et al.

(10) Patent No.: US 6,268,931 B1
(45) Date of Patent: Jul. 31, 2001

(54) DENSITY SEPARATION FOR MULTI-DENSITY PRINTING

(75) Inventors: Akitoshi Yamada; Hiromitsu Hirabayashi, both of Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/019,312

(22) Filed: Feb. 5, 1998

(51) Int. Cl.[7] ............................................. B41J 2/21
(52) U.S. Cl. ............................................. 358/1.9; 382/162
(58) Field of Search ........................... 358/1.9, 501–504, 358/518–523; 382/162–167

(56) References Cited

U.S. PATENT DOCUMENTS

| | | | |
|---|---|---|---|
| 4,860,026 * | 8/1989 | Matsumoto et al. | 358/298 |
| 4,959,659 * | 9/1990 | Sasaki et al. | 346/46 |
| 5,142,374 | 8/1992 | Tajika et al. | 358/298 |
| 5,488,398 | 1/1996 | Matsubara et al. | 347/43 |
| 5,500,661 | 3/1996 | Matsubara et al. | 347/41 |
| 5,617,123 | 4/1997 | Takaoka et al. | 347/15 |
| 5,633,663 | 5/1997 | Matsubara et al. | 347/41 |
| 5,729,259 | 3/1998 | Gotoh et al. | 347/43 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

Pixel data are processed in digital color printing, by mapping a multi-value input intensity value for a color to be printed into a multi-value first quantity level for a first ink which is the color to be printed, the first ink having a first density. The input intensity value corresponding to the color to be printed is also mapped into a multi-value second quantity level for a second ink which is the color to be printed, the second ink having a second density which is greater than the first density. A four-position binary dot pattern is then generated for the first and second inks based on the first and second quantity levels. During the mapping, the first quantity level is limited to a value which would result in causing not more than two dots in the four-position binary dot pattern to be generated for the first ink.

102 Claims, 16 Drawing Sheets

| FIG. 3A |
| FIG. 3B |
| FIG. 3C |

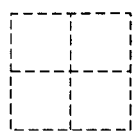
FIG. 9A
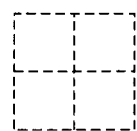
FIG. 10A
0
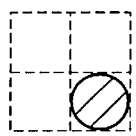
FIG. 9B
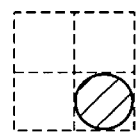
FIG. 10B
1/8
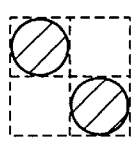
FIG. 9C
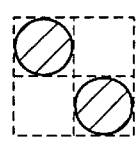
FIG. 10C
2/8
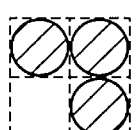
FIG. 9D
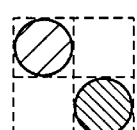
FIG. 10D
3/8
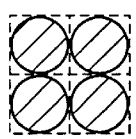
FIG. 9E
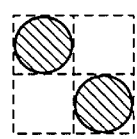
FIG. 10E
4/8
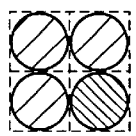
FIG. 9F
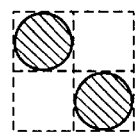
FIG. 10F
5/8
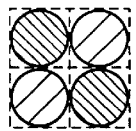
FIG. 9G
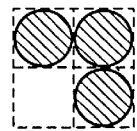
FIG. 10G
6/8

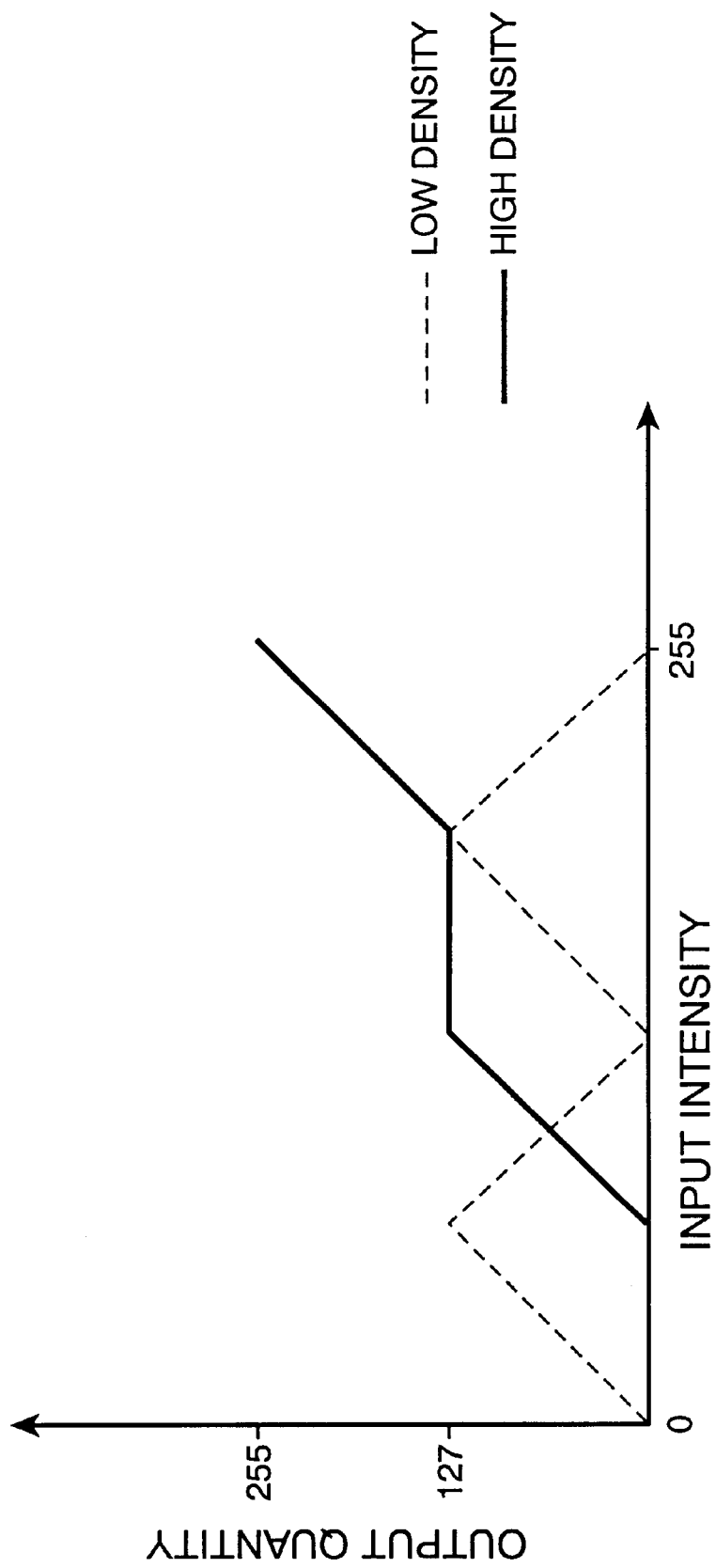

DENSITY SEPARATION FOR MULTI-DENSITY PRINTING

BACKGROUND OF THE INVENTION

1. Field of the Invention

The present invention concerns density separation for use in digital multi-density printing. More particularly, the invention is directed to an efficient technique for separating an input signal representing a desired intensity level for a certain color into two signals: one corresponding to a desired quantity level of low optical density ink of that color and the other corresponding to a desired quantity level of high optical density ink of the same color.

2. Description of the Related Art

Recently, it has been proposed to perform digital printing using multiple inks, each having a different optical density but the same color, for each primary color. For example, low density cyan ink will print a lighter cyan dot than high density cyan ink. By providing the option of intermediate values for each dot on a page, multi-density printing can often provide better resolution and/or color range. One such conventional technique thus uses both high and low density inks for each of cyan (C), magenta (M), yellow (Y) and black (K).

An example of conventional processing for multi-density printing is illustrated in FIG. 1. In step S101, multi-value data for each of the red (R), green (G) and blue (B) components are input and then color corrected based on input device characteristics to obtain multi-value CMY data. In step S102, undercolor removal and black component generation are performed to extract a black component from the multi-value CMY data. In step S104, color correction is performed based on factors such as type of output medium to be used. In step S105, the CMYK values are output corrected to compensate for factors such as printer head characteristics and printing direction.

Up to this point, the data has been processed in multi-value format, typically with each color component represented by a value ranging from 0 to 255 (8 bits). In step S106, these multi-value data are converted to binary patterns for the high density inks (shown in FIG. 1 as CMYK) and the low density inks (shown as in FIG. 1 as cmyk) using multi-level halftoning. Thus, density separation in this particular conventional technique is performed during halftoning. The output halftone image data generally can be printed directly, for example by using one printer head for all of the low density inks and a different printer head for all of the high density inks.

As noted above, one example of such multi-level halftoning is simply to print no dot, a light dot or a dark dot for each pixel, based on which is closest to the pixel's input intensity level. However, this technique often does not provide good visual results. In particular, by using the foregoing multi-level halftoning technique in regions where the input intensity level is greater than 127, each pixel generally will be represented by either a low density ink dot or a high density ink dot. Therefore, within those regions ink coverage ordinarily will be equal to 100%. In this situation, it is difficult to perform ink limitation, which is described in more detail below.

Another example of such multi-level halftoning is shown in FIG. 2. Specifically, for each color plane an index, corresponding to a four-position dot grid, is generated for each pixel, depending upon the pixel's input intensity level. Thus, as shown in FIG. 2, if the input intensity level for cyan falls within range 1, Index #0 which corresponds to an empty four-position grid is output. On the other hand, if the input intensity level falls within range 2, Index #1 is output, corresponding to a grid having only a light dot in each of the upper left and lower right corners. Similarly, if the input intensity level falls within range 4, Index #3 is output, corresponding to a grid having dark dots in the upper left and lower right corners and light dots in the lower left and upper right corners.

Although the foregoing technique provides density separation, it is often difficult to obtain high quality printing when using this technique. Specifically, when the dark density ink and light density ink are printed using different printer heads, misalignment of the printer heads can often result in noticeable degradation of image quality.

FIG. 3 illustrates this problem. specifically, FIG. 3A shows the printer output when Index #3 is printed in the ideal situation, i.e., where the two printer heads are perfectly aligned. However, as shown in FIG. 3B, when a small horizontal misalignment occurs, dots begin to overlap and portions of the light dots are obscured, resulting in less ink coverage. The visual effect of this situation is to lower resolution and decrease overall intensity levels. As shown in FIG. 3C, the printed document becomes even further degraded when misalignment becomes more severe.

Another conventional technique is illustrated in FIG. 4. According to this technique, input correction (step S401) and undercolor removal (step S402) are performed as in steps S101 and S102, respectively. After step S402, density separation is performed in step S404. Specifically, in step S404 the four input ulti-value CMYK values are converted to four multi-value amounts, one corresponding to each of the four high density ink (CMYK) quantities, and also are converted to four additional multi-value amounts, one corresponding to each of the low density ink (cmyk) quantities.

Density separation in this technique is ordinarily performed by independently mapping each color component value to a low optical density ink amount and to a high optical density ink amount. A typical conventional mapping is shown in FIG. 5, in which the low density ink is assumed to have a density of one-half of that of the high density ink. As shown in FIG. 5, as the input intensity level increases, the low density ink amount increases linearly and the high density ink amount remains zero until the input intensity level reaches 127, at which point the low density ink amount is 255. Further increases in input intensity amount result in a linear decrease low density ink amount and a linear increase in the high density ink amount until the input intensity level reaches 255, at which point the low density ink amount is zero and the high density ink amount is 255. The foregoing mapping is frequently performed using one or two look-up tables.

Returning again to FIG. 4, upon completion of density separation in step S404, ink adjustment is performed in step S405. Ink adjustment involves making adjustments between the amounts of low and high density inks for each ink color so as to achieve a greater range of printable colors.

Color correction is then performed in step S407. Although the goals are the same as in step S104 described above, the processing in step S407 typically is more cumbersome compared to that in step S104 because 8 values (CMYKcmyk) must be corrected. Moreover, because two values need to be corrected for each color in this technique, often it can be difficult to insure that tones continue to change smoothly after such processing has been completed.

In step S408, output correction is performed based on printer head characteristics.

Finally, in step S409 halftoning is performed in each of the eight color/density planes in order to binarize the ink values for subsequent printing.

While accomplishing density separation, the foregoing conventional processing also has the following problems. First, an additional step of ink adjustment ordinarily is required to be performed, which can require a significant amount of complicated processing. Furthermore, as noted in detail above, performing color correction becomes more cumbersome when two values for each color are to be processed. Finally, in order to insure smooth tonal changes, color correction in this technique generally is required to be specifically tailored to the number of inks, as well as to the ink densities. As a result, changing the number or the densities of the inks used is often difficult with this conventional technique.

Accordingly, what is needed is a more flexible and efficient technique for achieving density separation and ink adjustment.

Moreover, in order to avoid bleeding of ink droplets, it is often desirable to limit the number of ink droplets in each predetermined area, particularly with respect to high intensity levels for which a large number of ink droplets are to be deposited on the recording medium. This type of ink limitation is especially important when more than one ink is used to generate an output color.

SUMMARY OF THE INVENTION

The present invention addresses these needs by providing a technique in which density separation and ink adjustment are performed in a single step.

Thus, in one aspect of the invention, pixel data are processed for digital color multi-density printing by mapping a multi-value input intensity value for a color to be printed into a multi-value first quantity level for a first ink which is the color to be printed, the first ink having a first density. The input intensity value corresponding to the color to be printed is also mapped into a multi-value second quantity level for a second ink which is the color to be printed, the second ink having a second density which is greater than the first density. A four-position binary dot pattern is then generated for the first and second inks based on the first and second quantity levels. During the mapping, the first quantity level is limited to a value which would result in causing not more than two dots in the four-position binary dot pattern to be generated for the first ink.

By virtue of the foregoing arrangement, dot placement is often less sensitive to printer head misalignment than when using conventional methods which perform density separation by multi-level halftoning. Moreover, because the invention performs density separation and ink limitation at the same time, a wide range of printable secondary colors can often be obtained without the necessity of subsequently performing a separate ink adjustment step. In addition, in a preferred embodiment color correction is performed prior to density separation/ink limitation so as to reduce the complexity of the color correction processing.

In another aspect of the invention, density separation and ink limitation are performed for digital color multi-density printing by converting a multi-value input intensity value into a multi-value first quantity level corresponding to a first ink having a first density and into a multi-value second quantity level corresponding to a second ink having a second density. The first and second inks are the same color, the second density is greater than the first density, and the maximum value of the first quantity level is set to be less than the maximum value of the second quantity level.

In a still further aspect of the invention, pixel data are processed for digital color multi-density printing by correcting input color component values based on output medium type, so as to obtain a multi-value corrected intensity value. The multi-value corrected intensity value is then converted into a multi-value first quantity level corresponding to a first ink having a first density and into a multi-value second quantity level corresponding to a second ink having a second density, while simultaneously correcting for printer head characteristics. A binary dot pattern is then generated for the first and second inks based on the first and second quantity levels. According to this aspect of the invention, the correcting step is performed before said converting step, the first and second inks have approximately the same color, the second density is greater than the first density, and the maximum value of the first quantity level is set to be approximately one-half of the maximum value of the second quantity value.

The foregoing arrangement also generally results in less sensitivity to printer head misalignment and provides a fast method of performing density separation and ink adjustment. Moreover, because density separation is performed after color correction, this embodiment can also provide for faster and more flexible color correction.

The invention also addresses the above-described needs by providing a technique in which ink limitation is based on a combination of inks.

Thus, according to another aspect of the invention, ink limitation is performed in digital color multi-density printing. A first correction is performed on a first set of color components so as to generate a second set of color components. A third set of color components is extracted from the second set of color components, each component of the third set of color components corresponding to an ink used for printing. A second correction then is performed on each component of the third set of color components, respectively. According to this aspect of the invention, the first correction includes a first ink limitation based on a combination of color components in the first set of color components, and the second correction includes a second ink limitation in which ink limitation is performed separately for each color in the third set of color components.

By virtue of the foregoing arrangement, appropriate ink limitation can often be performed regardless of whether an input color requires one or more than one different ink colors.

According to a still further aspect of the invention, density separation and ink limitation are performed in digital color multi-density printing. An input multi-value level is converted into a multi-value first quantity level corresponding to a first ink having a first density and into a second quantity level corresponding to a second ink having a second density. According to this aspect of the invention, the first and second inks are the same color, the conversion is performed by using a look-up table, and the conversion effects ink limitation for each of the first and second inks, respectively.

The foregoing arrangement can also result in less sensitivity to printer head misalignment, as well as providing a fast method of performing density separation and ink adjustment.

According to a still further aspect of the invention, ink limitation is performed in digital color multi-density printing. Correction is performed on a first set of color components based on a combination of color components, the correction including ink limitation based on a combination of inks.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 9A through 9G illustrate printed dot grids corresponding to varying intensity levels for a single color, generated from a conventional processing technique utilizing multi-level halftoning.

FIGS. 10A through 10G illustrate printed grids corresponding to varying intensity levels for a single color, generated from the mapping according to the invention shown in FIG. 12B.

FIGS. 12A through 12C are graphs illustrating different types of density separation mappings when using two inks per color according to the invention.

DETAILED DESCRIPTION OF THE PREFERRED EMBODIMENTS

Figure 6:
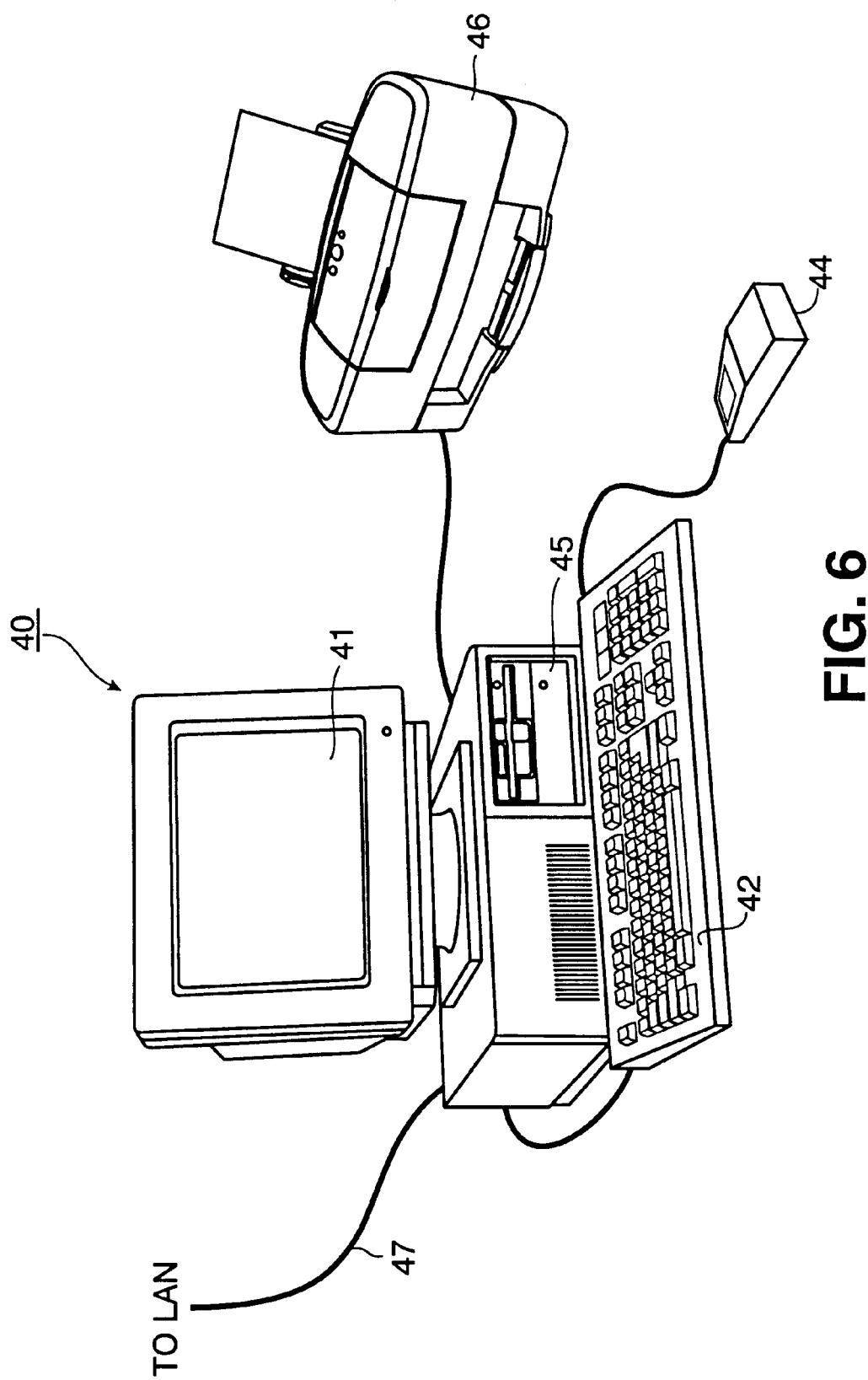
FIG. 6 is a perspective view of computing equipment which can be used in the practice of the present invention.

FIG. 6 shows the outward appearance of a representative embodiment of the present invention. Shown in FIG. 6 is computing equipment 40, such as a Macintosh or an IBM PC-compatible computer having a windowing environment, such as Microsoft® Windows. Provided with computing equipment 40 is a color display screen 41, such as a color monitor, keyboard 42 for entering text data and user commands, and pointing device 44, such as a mouse, for pointing to and manipulating objects displayed on display screen 41.

Computing equipment 40 includes a mass storage device, such as computer disk 45, for storing data files, which can include image data files, text data files, and other data files in compressed or uncompressed format, for storing application programs such as word and spreadsheet processing programs, and for storing other executable programs such as printer drivers. Such executable programs contain stored program instructions by which computing equipment 40 manipulates and stores data files on disk 45 and presents data in those files to an operator via the display screen 41 or by printing to color printer 46.

Image data may be generated internally in computing equipment 40 by executing application programs stored on disk 45 or may also be input into computing equipment 40 from a variety of other sources, such as from a scanner or a file server via local area network connection 47. It should be understood that, although a programmable general-purpose computer arrangement is shown in FIG. 6, a dedicated or stand-alone computer or other types of data processing equipment can be used in the practice of the present invention.

Figure 7:
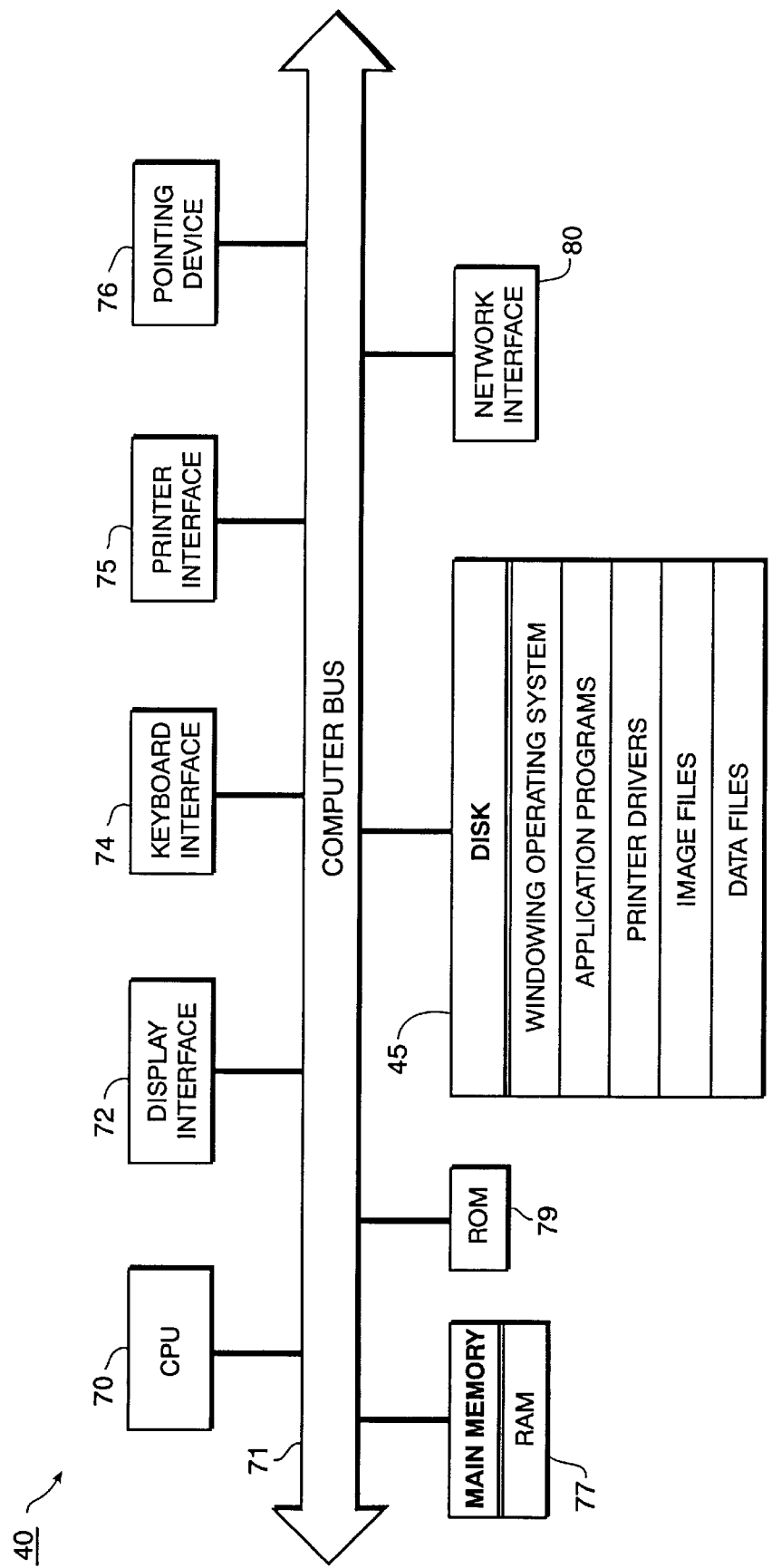
FIG. 7 is a block diagram of the computer workstation shown in FIG. 6.

FIG. 7 is a detailed block diagram showing the internal construction of computing equipment 40. As shown in FIG. 7, computing equipment 40 includes a central processing unit (CPU) 70 interfaced with computer bus 71. Also interfaced with computer bus 71 is display interface 72, keyboard interface 74, printer interface 75, mouse interface 76, main memory 77, ROM 79, disk 45 and network interface 80.

Main memory 77 interfaces with computer bus 71 so as to provide random access storage for use by CPU 70 when executing stored program instructions, such as executable printer drivers for multi-density printing, image processing programs, and various other application programs. More specifically, CPU 70 loads those programs from disk 45 into main memory 77 and executes those stored programs out of main memory 77.

Figure 8:
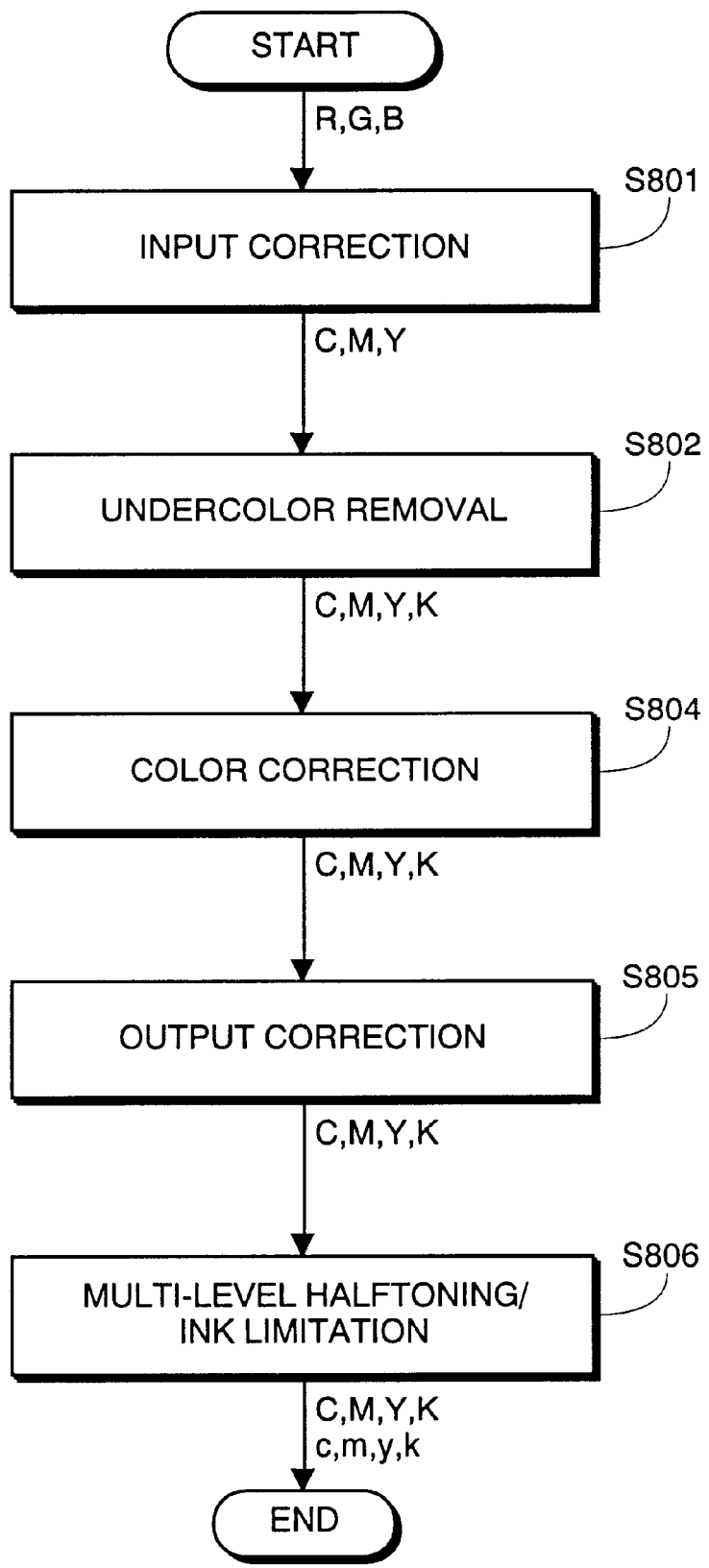
FIG. 8 is a flow diagram illustrating a first embodiment of data processing for multi-density printing according to the present invention.

Disk 45 stores various data and executable files, including a windowing operating system, various application programs, printer drivers, image files and other data files.
First Embodiment FIG. 8 is a flow diagram showing process steps for performing data processing for multi-density printing according to a first embodiment of the invention. Preferably, the process steps are included within a printer driver stored on disk 45, are downloaded from disk 45 to main memory 77, and then executed out of main memory 77 when a print job has been requested. Briefly, according to FIG. 8, RGB values for an image to be printed are input; input correction is performed based on input device characteristics to convert the data into CMY values; undercolor removal is performed to extract a black component from the CMY values; color correction is performed based on factors such as output medium; output correction is performed based on printer head characteristics; and finally, multi-level halftoning with ink limitation is performed to convert each of the CMYK values into indexes corresponding to different grid patterns of low and high density ink droplets.

In more detail, initially RGB values which correspond to a color document to be printed are input. Such RGB values may be provided, via the windowing operating system, by an application program such as a graphics, photograph, word or other data processing program. Typically, such data are provided in response to a user command to print a document.

In step S801, the input multi-value RGB data are subject to gamma correction. Preferably, gamma correction is performed as follows:

where γ has a default value of 1.0 or 1.2, depending on the printer head combination used, but can be varied by the user interface, and where max. Value $$\text{output} = \left(\frac{\text{input}}{\text{max. value}}\right)^{\gamma} * \text{max. value}$$

equals 255.

Also in step S801, source correction is performed in order to convert the multi-value RGB values into CMY values and to correct for source characteristics, if necessary. Preferably, source correction is calculated as follows:

$C=h(R)$ $M=h(G)$ $Y=h(B)$

More preferably, $h(x)=255-x$ $(x=0, 1, 2, \ldots 255)$
when the RGB values have been provided as computer generated graphics. Otherwise, for input data from other sources such as video or monitor generated documents, $h(x)$ is provided via a look-up table specifically tailored to the particular input source.

In step S802, black generation and undercolor removal are performed for the input-corrected multi-value CMY data, so as to extract a black (K) component from the CMY data. Preferably, this step is performed as follows:

$K=\min(C,M,Y)$ $C=C-K$ $M=M-K$ $Y=Y-K$

In step S804, color correction is performed in which the multi-value CMYK data are corrected based on factors such as output medium type, human color perception and lighting. In particular, in this step all interdependent color processing (i.e., processing in which at least one primary color is modified based on a value for another primary color) is performed. Preferably, this step is performed in the following sub-steps. First, secondary colors are generated as follows:

$R=\min(M,Y)$ $G=\min(Y,C)$ $B=\min(C,M)$

Next, $C_1$, $M_1$ and $Y_1$, are calculated as follows:

$C_1=C-G-B$ $M_1=M-R-B$ $Y_1=Y-G-R$

Finally, corrected multi-value CMY values are determined as follows:

$C=C_c(C_1)+M_c(M_1)+Y_c(Y_1)-R_c(R)+G_c(G)+B_c(B)$ $M=C_m(C_1)+M_1(M_1)+Y_m(Y_1)+R_m(R)-G_m(G)+B_m(B)$ $Y=C_y(C_1)+M_y(M_1)+Y_y(Y_1)+R_y(R)+G_y(G)-B_y(B)$ where $C_i$, $M_i$, $Y_i$, $R_i$, $G_i$ and $B_i$ for $i=C,M,Y$ are implemented using look-up tables, each of which inputs integer values in the range of 0 to 255 and produce output values in the range of 0 to 255. The specific look-up tables used are selected based on detected and/or user-specified parameters.

Additional processing may also be performed in step S804. For example, techniques may be employed in order to reduce the bleeding of black ink into color areas during printing. In this regard, portions of the black ink values may be converted into process black (i.e., black synthesized using CMY inks), and black ink nozzles may be assigned in a manner so as to reduce black ink bleeding.

In step S805, output correction is performed. Specifically, each of the CMYK values is independently corrected based on printer head characteristics and based on whether the pixel is to be printed during a forward or reverse pass of the printer head. Preferably, this correction is performed using a look-up table which is the same for each of the multi-value CMYK values.

In step S806, multi-level halftoning with ink limitation is separately performed for each of the multi-value CMYK components. The output of this step for each such CMYK component is an index corresponding to a dot pattern which is composed of a combination of low and high density ink dots of that color. Specifically, a grid of low and high density ink dots is provided for each color component of each input pixel, and the combination of dots in the grid is selected to approximate the input intensity value for the pixel.

Moreover, the patterns are arranged so as to leave at least one-half of the available grid positions open for the highest possible input intensity level. An example in which the indexes correspond to four-dot grid patterns will now be described with reference to FIGS. 9 and 10.

It should be understood that FIGS. 9 and 10 are provided merely to illustrate the advantages of the present invention in a simple manner. Actual ink dot patterns, as well as relative sizes and positions, will vary based on factors such as printer head alignment and output medium ink absorption characteristics.

Figure 1:
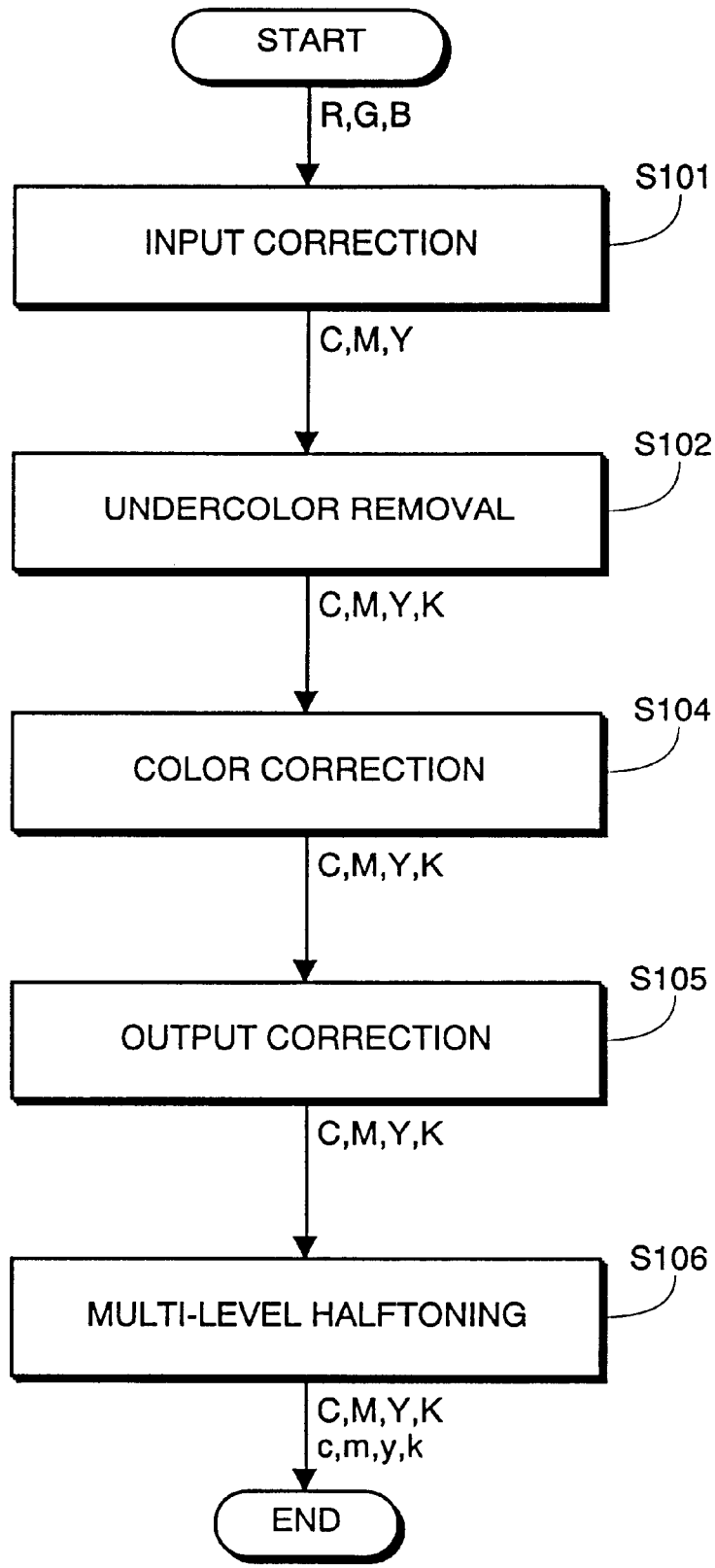
FIG. 1 is a flow diagram illustrating a conventional technique of data processing for multi-density printing in which density separation is performed using multi-level halftoning.
Figure 2:
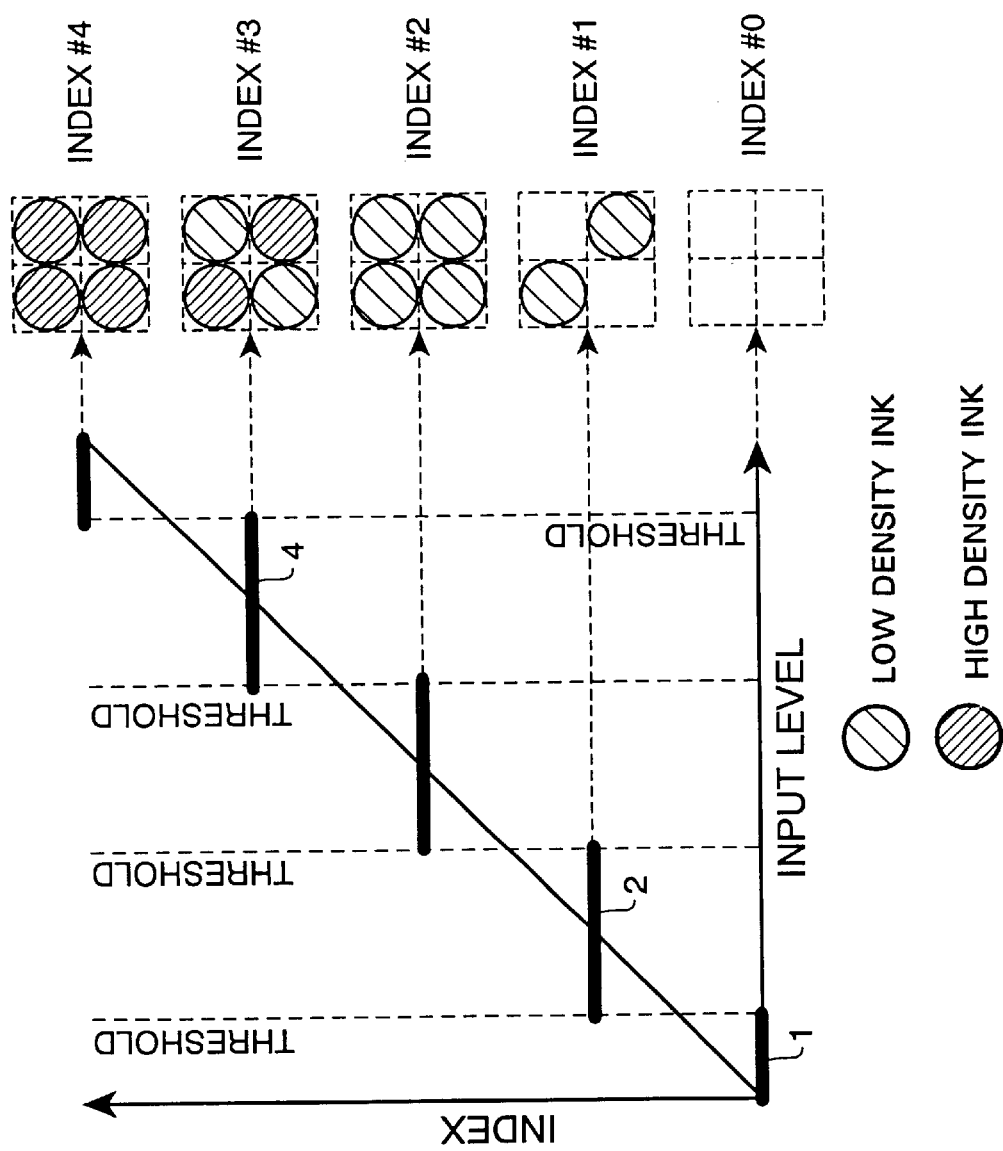
FIG. 2 is a graph illustrating results of a conventional method of multi-level halftoning.
Figure 3A:
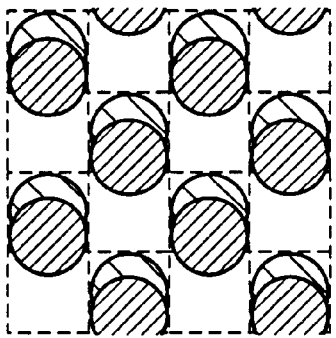
FIG. 3 illustrates the effect of printer head misalignment when density separation is performed using multi-level halftoning.
Figure 3B:
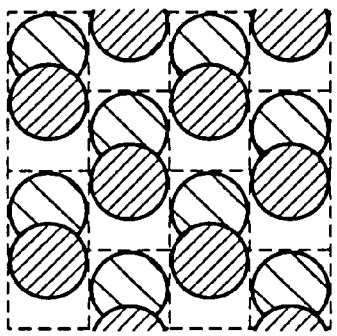
Figure 3C:
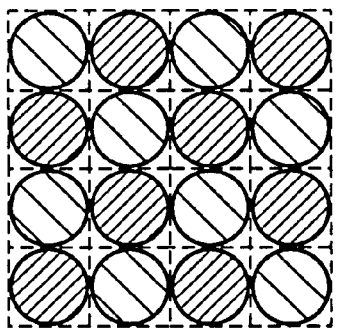
Figure 3:

FIGS. 9A through 9G illustrate representative four-dot grids corresponding to index outputs when performing conventional multi-level halftoning, such as shown in FIG. 1, for different input pixel intensities. For simplicity, the following discussion assumes that the input intensity levels are normalized so as to range from 0 to 1. In these figures, each 2×2 grid corresponds to a single input pixel.

Thus, FIG. 9A shows an empty 4-position grid which is output for an input intensity level of 0. FIG. 9B shows the grid which is output for an input intensity level of 1/8: one low density ink dot in the lower right corner. FIG. 9C shows the grid for an input intensity level of 2/8: a low intensity dot in the upper left and lower right corners. FIG. 9D shows the grid for an input intensity level of 3/8, and FIGS. 9E through 9G show the output grid for input intensity levels of 4/8, 5/8 and 6/8, respectively. As will be seen below in comparison with FIG. 10, the conventional method does not provide ink limitation.

FIGS. 10A through 10G show representative four-position dot grids which result when performing multi-level halftoning with ink limitation as in step S806. Specifically, FIG. 10A corresponds to an input intensity level of 0, FIG. 10B to 1/8, and FIGS. 10C through 10G to 2/8, 3/8, 4/8, 5/8 and 6/8, respectively. In FIG. 10 also, each 2×2 grid corresponds to an input pixel.

Each secondary color requires a combination of two primary colors. Accordingly, in order to achieve the best range of secondary colors, it is preferable that no more than two of the four grid positions be occupied by a single primary color, so that the other two positions are available for a different primary color. In this regard, the conventional technique illustrated in FIGS. 9A through 9G can be compared to that of the present invention shown in FIGS. 10A through 10G, respectively. As can be seen in FIG. 9D, the prior art method requires three grid positions when the input intensity level is merely 3/8. On the other hand, with the present invention only two grid positions are required until the input intensity levels reach 6/8. Accordingly, by maintaining two open positions for another primary color at higher input intensity levels, the present invention is often able to achieve a better range of secondary color generation than conventional methods would permit.

Second Embodiment

In the first embodiment described above, density separation is performed during halftoning by assigning an index corresponding to a four-dot grid to each pixel. As a result, a 2×2 grid is required to represent each pixel. In the second embodiment, density separation is performed prior to halftoning, thereby permitting halftoning to be separately performed for each ink, rather than for each color, by employing dithering or error diffusion. As a result, the second embodiment generally permits each pixel to be represented by a single dot, thus providing better resolution.

Figure 11:
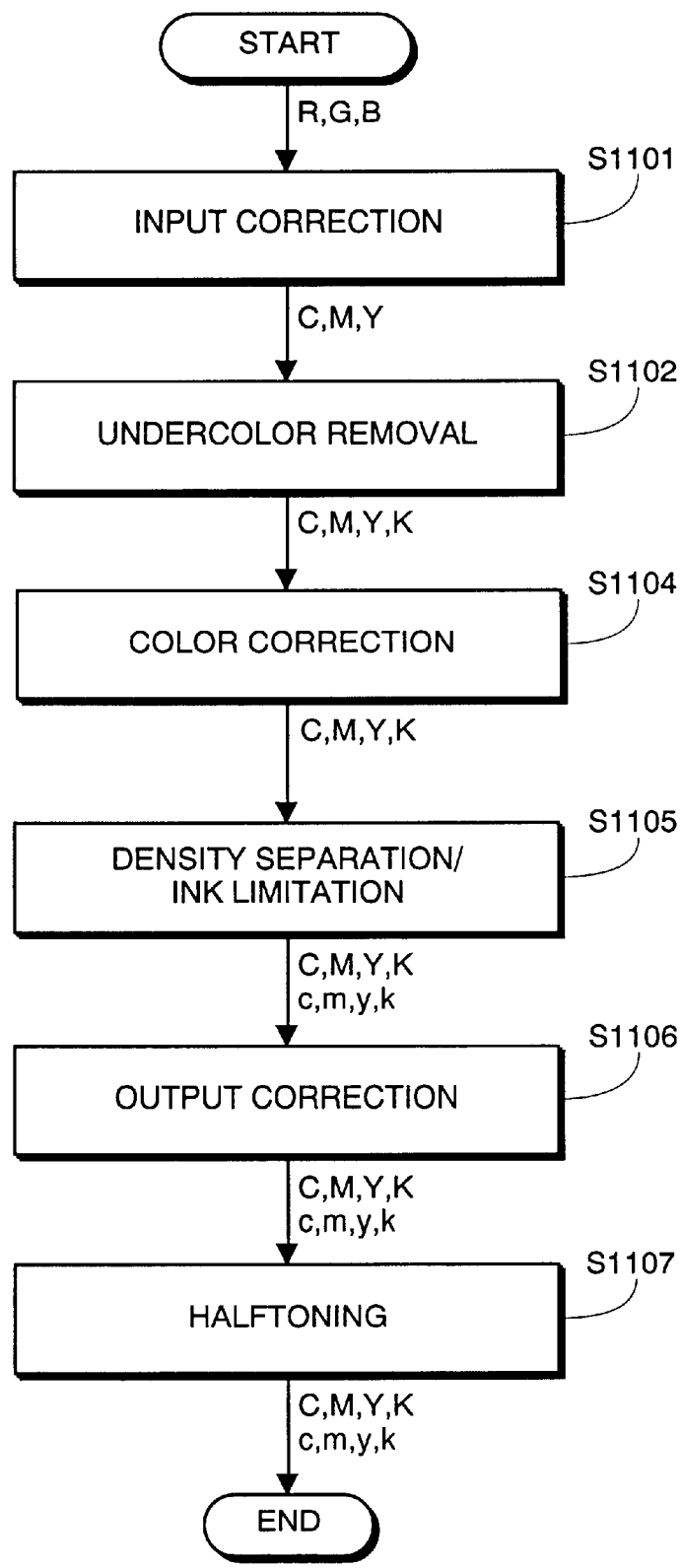
FIG. 11 is a flow diagram illustrating a second embodiment of data processing for multi-density printing according to the present invention.

FIG. 11 is a flow diagram showing process steps for performing data processing for multi-density printing according to a second embodiment of the invention. Preferably, the process steps are included within a printer driver stored on disk 45, are downloaded from disk 45 to main memory 77, and then executed out of main memory 77 when a print job has been requested. Briefly, according to FIG. 11, RGB values for an image to be printed are input; input correction is performed based on input device characteristics to convert the data into CMY values; undercolor removal is performed to extract a black component from the CMY values; color correction is performed based on factors such as output medium; density separation and ink adjustment processing are performed in a single step on the multi-value CMYK values to obtain multi-value CMYK data for high density inks and cmyk data for low density inks; output correction is performed based on printer head characteristics; and finally, halftoning is performed to independently binarize each of the eight CMYKcmyk values.

In more detail, initially RGB values which correspond to a color document to be printed are input. Then, in step S1101 input correction is performed as in step S801 described above.

In step S1102, undercolor removal is performed as in step S802 described above.

In step S1104, color correction is performed as in step S804 described above.

In step S1105, density separation and ink limitation are performed by mapping the input multi-value CMYK values into multi-value data for high optical density ink (CMYK values) and for low optical density ink (cmyk values). Preferably, this mapping is performed using a look-up table, such as a table having input/output characteristics similar to one of the graphs shown in FIGS. 12A through 12C.

Figure 12A:
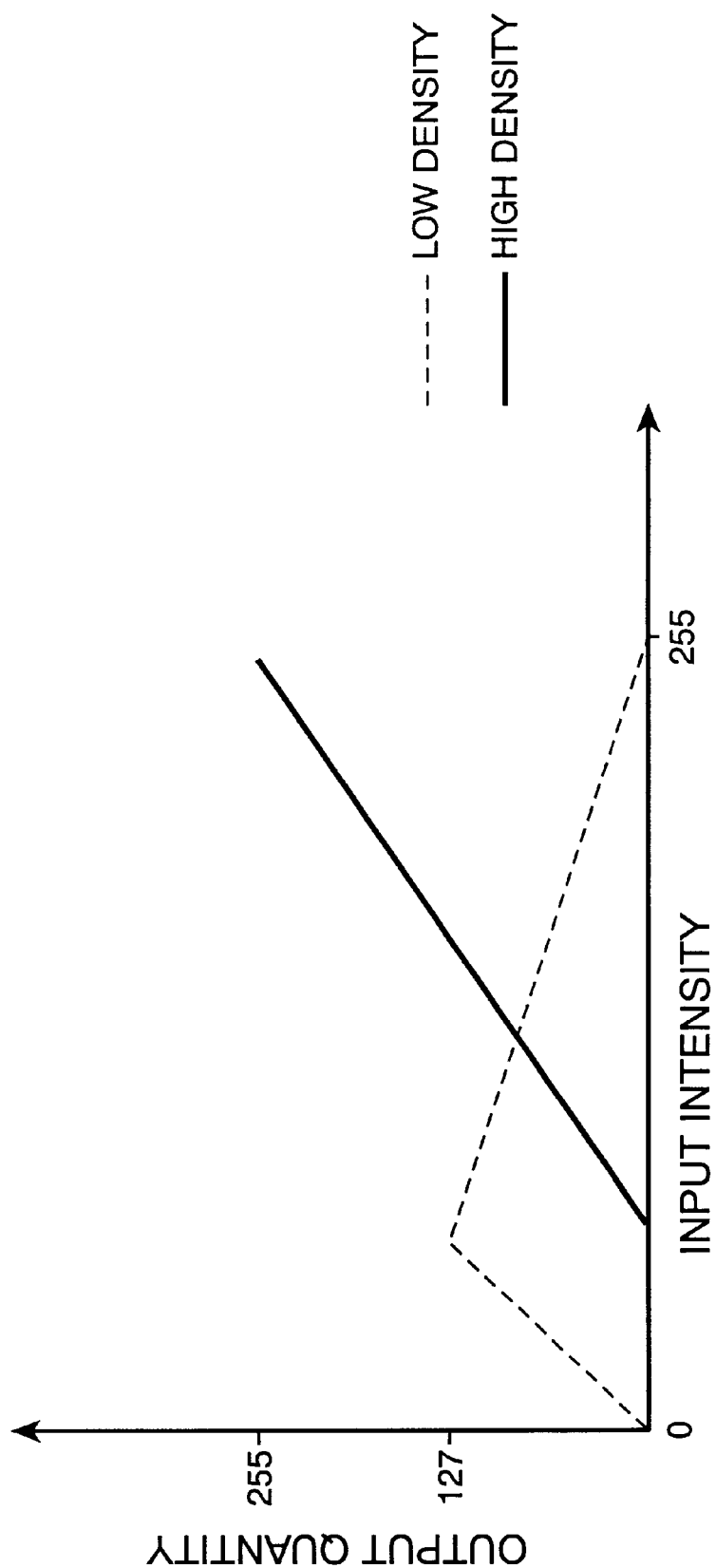

Specifically, FIG. 12A illustrates an example of a mapping function for the situation where the low density ink has a density which is exactly equal to one-half the density of the high density ink. As seen in FIG. 12A, for each input intensity level from 0 to 255 the table outputs both an 8-bit quantity level for the low density ink and an 8-bit quantity level for the high density ink, which printed together would provide the input intensity level. Also as seen in FIG. 12A, the low density ink quantity level is limited to one-half of both its and the high density ink's maximum possible value.

By so limiting the quantity level of low density ink in this manner, the total number of low density ink dots in the final halftoned output generally will be less than fifty percent, subject to any effects of accumulated error if error diffusion is used. Because the low density ink for any given color in the final output is generally limited to fifty percent of the total number of dots, a greater range of secondary colors often can be produced.

In the mapping shown in FIG. 12A, low density ink is used exclusively to provide the required intensity level until a limit is reached at which when halftoning is performed for this color/density ink, no more than 50% of the available dot positions will be printed. For instance, for each four-position output dot grid no more than two dots will be printed in low density ink for each color. In the present embodiment, this limit is set to be the midpoint of the available range of quantity levels, or 127. As shown in FIG. 12A, further increases in the input intensity level result in reduction of the low density ink amount and increases in the high density ink amount in a manner which would provide the input intensity level.

Figure 12B:
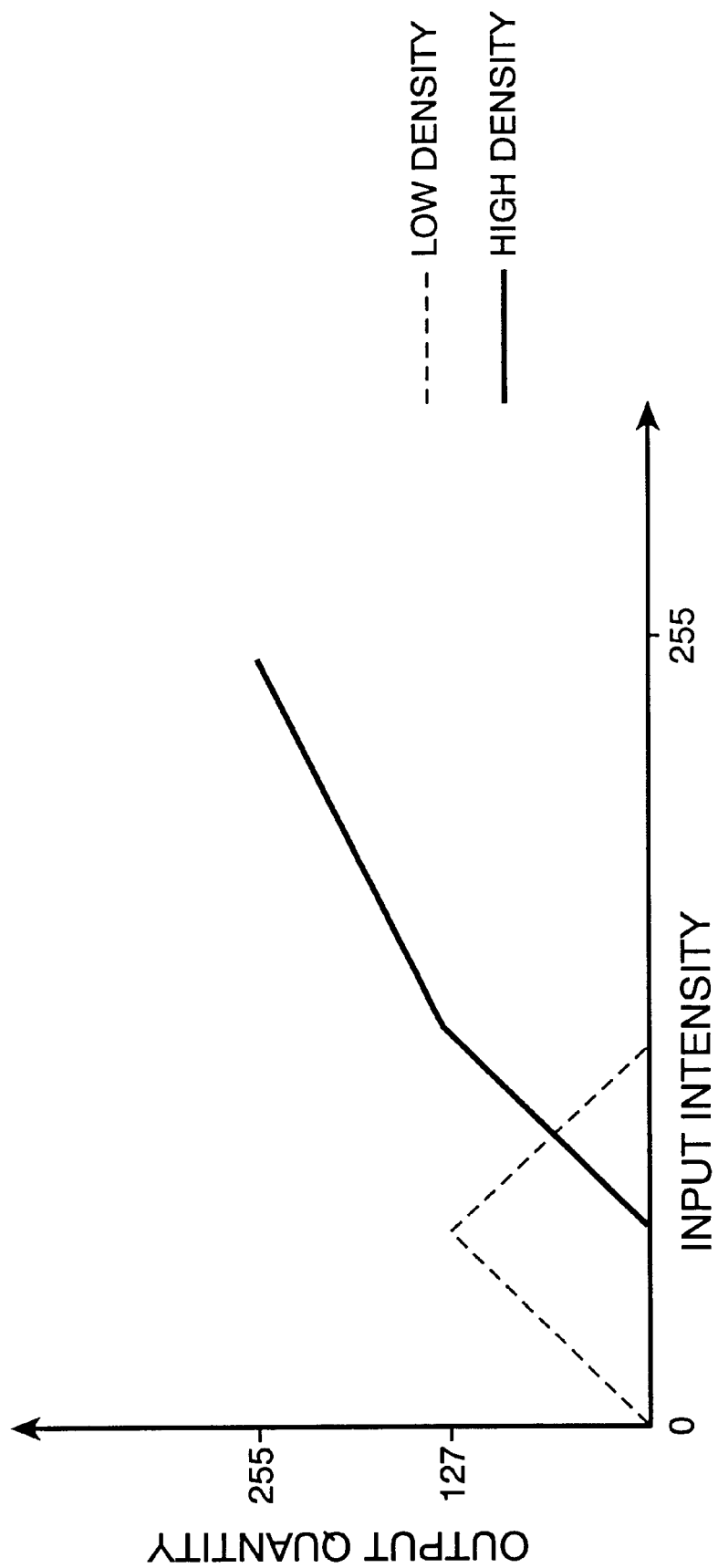

FIG. 12A is not the only mapping which can be used. FIGS. 12B and 12C illustrate other alternative mappings in which an input intensity level is input and quantity levels for both low and high density inks are output. In each of FIGS. 12B and 12C, the low density ink amount is limited to a value which for each color would result in no more than fifty percent of the dots in the final halftone pattern being low density ink. In the present embodiment, that effect is achieved by limiting the low density ink amount to one-half of its maximum potential value. Moreover, the mappings illustrated in FIGS. 12A through 12C are designed so that printing the output low density and high density ink amounts together would provide an intensity equal to the corresponding input intensity value. Other mappings satisfying the foregoing conditions are also possible, with the specific mapping being selected based on other design considerations.

It is noted that the mappings shown in FIGS. 12A through 12C were created on the assumption that ink quantity translates linearly into output intensity. Thus, for instance, it is assumed that the same output intensity level that results when using a certain quantity of high density ink can be achieved using twice as much low density ink that has one-half the density of the high density ink. In fact, however, actual relationships between ink densities, ink quantities and resulting intensity levels are more complicated, and depend on properties, such as absorption properties of the output medium used. Accordingly, while FIGS. 12A through 12C show the mappings as being piecewise-linear, the actual shapes are likely to be somewhat different, and will vary based on output medium characteristics. Thus, actual mappings should be determined experimentally for each output medium.

It is also noted that the present embodiment uses a single look-up table which provides quantity levels for both low density and high density inks. However, it is also possible to use separate look-up tables for the low density and high density ink quantities.

Returning now to FIG. 11, in step S1106 output correction is performed. Specifically, each of the CMYKcmyk values is independently corrected based on printer head characteristics and based on whether the pixel is to be printed during a forward or reverse pass of the printer head. Preferably, this correction is performed using a look-up table which is the same for each of the eight multi-value CMYKcmyk values.

In step S1107, halftoning is separately performed for each of the multi-value CMYKcmyk components. Specifically, for each of the eight color/density planes either conventional dithering (preferable for text and line images) or conventional error diffusion (preferable for natural images) is performed.

As noted above, by limiting the quantity of low density ink in step S1105 to one-half of its maximum potential value, when halftoning is performed no more that fifty percent of the dots in the output dot pattern for each color will be low density ink. Similarly, for most cases when error diffusion is performed the number of low density ink dots will be limited to fifty percent of the total, that except in certain cases where accumulated error from surrounding pixels increases the quantity of low density ink for a given pixel to a value which would result in more than two dots. As a result of so limiting the low density ink amount, a greater range of secondary colors at intermediate intensity levels will be capable of being generated.

The foregoing effect is therefore similar to that of the indexing effect described for the first embodiment above. At the same time, by using density separation and ink limitation as shown in FIG. 12 and applying halftoning to each ink, rather than each color, each input pixel generally can be represented by a single dot. Therefore, better resolution usually can be obtained.

Figure 4:
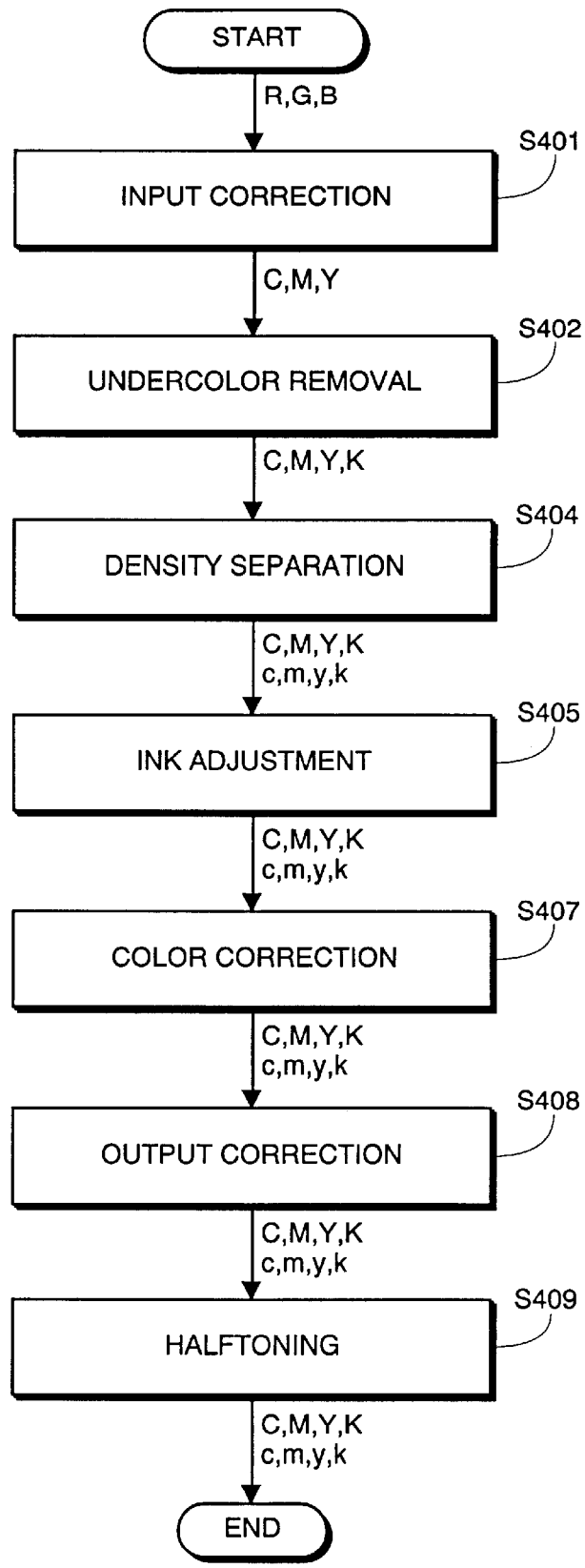
FIG. 4 is a flow diagram of a second conventional technique for data processing in multi-density printing.
Figure 5:
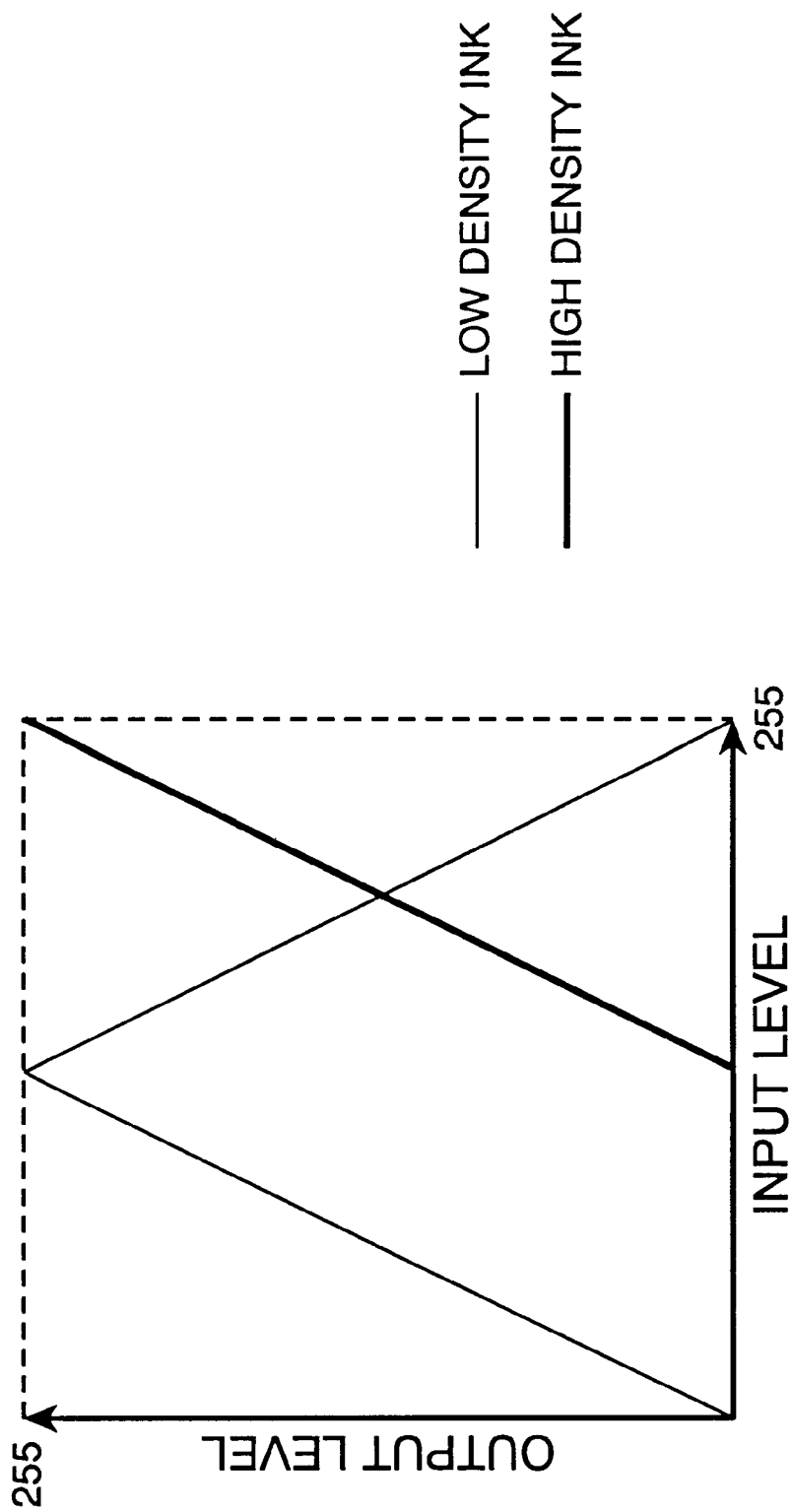
FIG. 5 is a graph illustrating a mapping technique for performing density separation in conventional multi-density printing.

As noted above, conventional techniques, such as the technique illustrated in FIG. 4, can attempt to avoid this problem by performing an additional step of ink adjustment. However, such ink adjustment often requires complicated additional processing. Ink limitation in the present embodiment of the invention, on the other hand, is performed simultaneously with density separation, merely by appropriately modifying the density separation look-up table. Thus, no additional processing time typically is required.

In this embodiment, because density separation and ink limitation are performed in a single step, processing can be both efficient and flexible. With regard to flexibility, for example, altering the number or densities of inks used often can be implemented merely by changing the mappings. In the foregoing embodiment, this simply requires replacing look-up tables.

Third Embodiment

Figure 13:
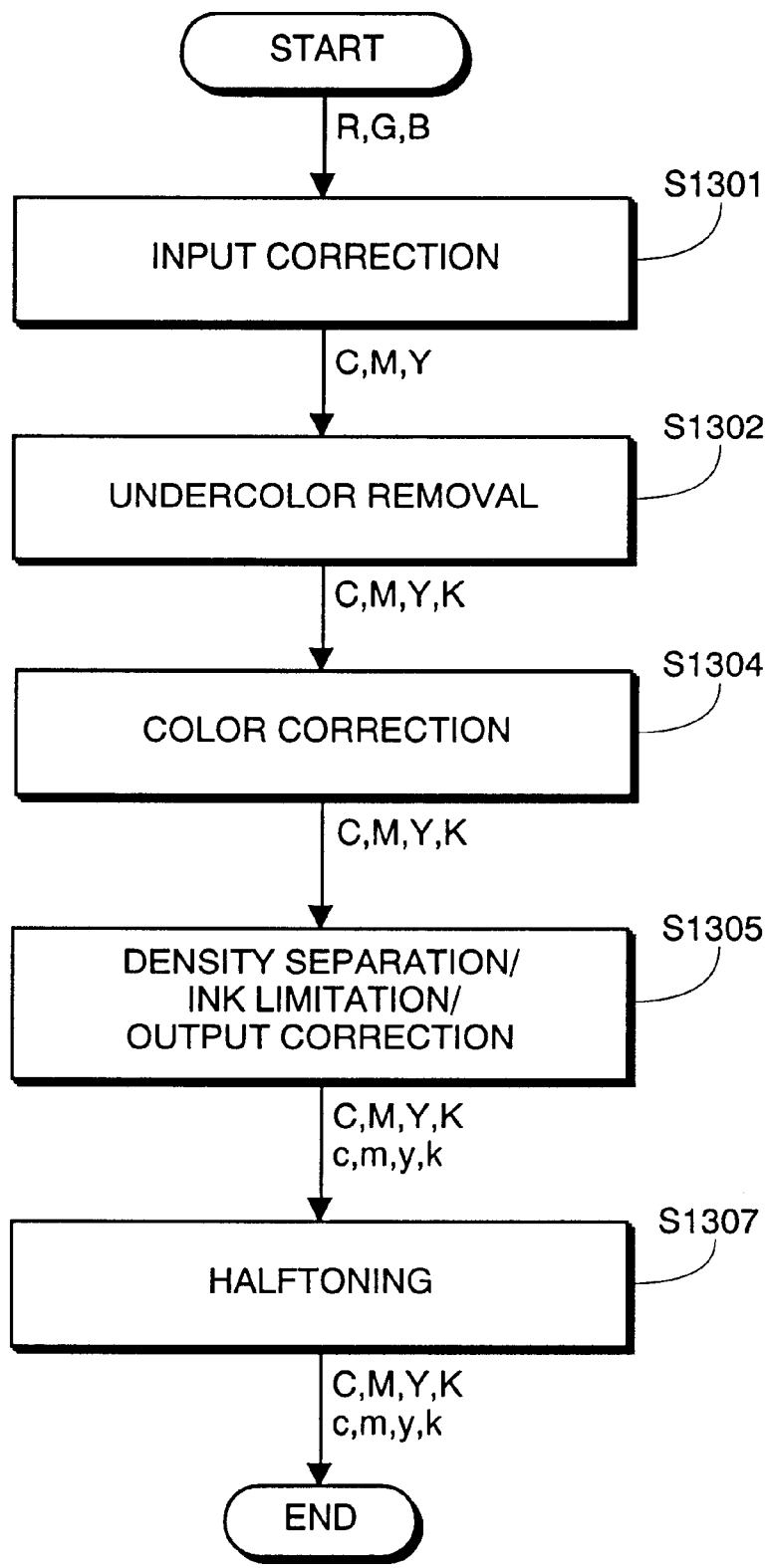
FIG. 13 is a flow diagram illustrating a third embodiment of data processing for multi-density printing according to the present invention.

In addition, even further efficiencies can be achieved by performing output correction in the same step in which density separation and ink limitation are performed. This third embodiment of the invention is illustrated in FIG. 13. Briefly, according to FIG. 13, RGB values for an image to be printed are input; input correction is performed based on input device characteristics to convert the data into CMY values; undercolor removal is performed to extract a black component from the CMY values; color correction is performed based on factors such as output medium; density separation, ink adjustment and output correction processing are performed in a single step on the multi-value CMYK values to obtain multi-value CMYK data for high density inks and cmyk data for low density inks; and finally, halftoning is performed to independently binarize each of the eight CMYKcmyk values.

In more detail, in step S1301 input correction is performed as described for step S801 above.

In step S1302, undercolor removal is performed as described for step S802 above.

In step S1304, color correction is performed as described for step S804 above.

In step S1305, the results of steps S1105 and S1106 described above are achieved using a single mapping for each color/density plane. Preferably, these mappings are derived in advance as follows. Both the density separation/link limitation of step S1105 and the output correction of step S1106 utilize separate mappings for each of the eight color/density planes. Accordingly, in this embodiment each mapping in step S1106 is combined with the corresponding mapping in step S1105 to provide a single mapping which accomplishes density separation, ink limitation and output correction for a particular color/density plane. Each of the eight resulting mappings is applied in step S1305.

In step S1307, halftoning is performed as described for step S1107 above.

Thus, in this embodiment density separation, ink limitation and output correction are all performed by a single mapping, resulting in even more efficient processing and reducing the amount of memory required for look-up tables.

Fourth Embodiment

In the second and third embodiments described above, ink limitation is performed separately for each of the different ink colors used. This type of ink limitation is also employed in the third embodiment of the invention. However, in addition to this type of ink limitation, the fourth embodiment also uses a different type of ink limitation which is incorporated into the color correction step.

Figure 14:
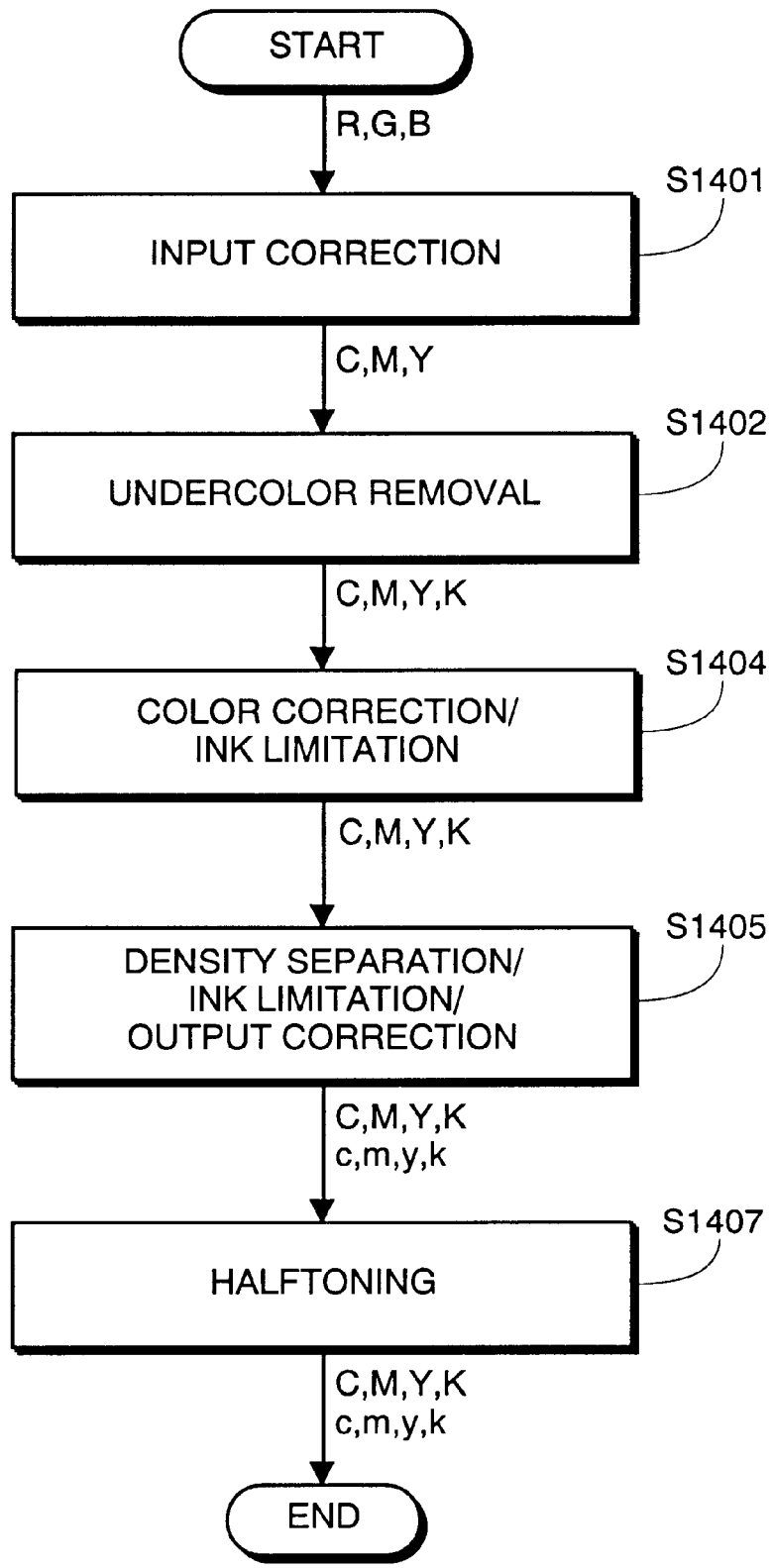
FIG. 14 is a flow diagram illustrating a fourth embodiment of data processing for multi-density printing according to the present invention.

FIG. 14 illustrates the processing according to the fourth embodiment of the invention. Briefly according to FIG. 14, RGB values for an image to be printed are input; input correction is performed based on input device characteristics to convert the data into CMY values; undercolor removal is performed to extract a black component from the CMY values; color correction and ink limitation are performed based on factors such as the characteristics and type of output medium used; density separation, ink adjustment and output correction processing are performed in a single step on the multi-value CMYK values to obtain multi-value CMYK data for high density inks and cmyk data for low density inks; and finally, halftoning is performed to independently binarize each of the eight CMYKcmyk values.

In more detail, in step S1401 input correction is performed as described for step S801 above.

In step S1402, undercolor removal is performed as described for step S802 above.

In step S1404, color correction is performed. Specifically, color correction in step S1404 includes mapping functions to achieve the features described above for step S804. In addition, the mapping functions in step S1404 include ink limitation based on output medium absorption characteristics. In the ink limitation of step S1404 each ink amount is adjusted based not only upon the input amount for that ink, but also based upon the input amounts for the other inks.

Specifically, ink limitation in step S1404 attempts to prevent the total amount of all inks used from exceeding the maximum absorption capacity of the output medium. Thus, for instance, if the input color is pure cyan the amount of cyan ink generally will not need to be adjusted at all during this step. Similarly, if the input color is pure magenta the amount of magenta ink generally will not need to be adjusted during this step. However, if the input color is blue, which consists of both cyan and magenta, a different situation exists. In this case, both the cyan and magenta ink amounts might need to be limited in order to prevent the total amount of cyan and magenta inks from exceeding the output medium's maximum absorption capacity.

Figure 15A:
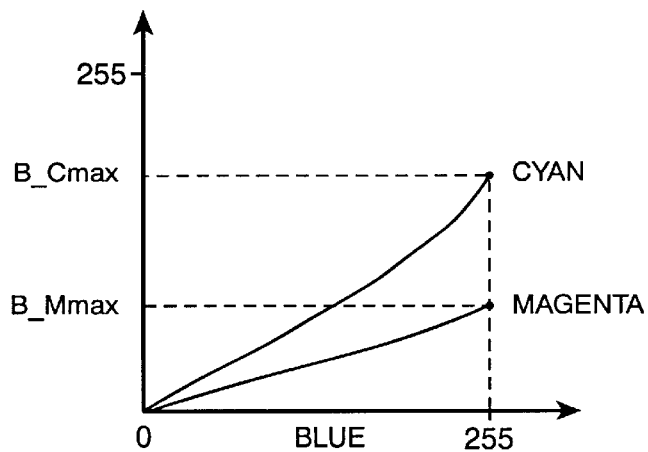
FIGS. 15A to 15C illustrate processing results according to the fourth embodiment of the invention when the input color is blue.

The foregoing example is illustrated in FIG. 15A. Specifically, FIG. 15A illustrates the ink limitation mapping portion of step S1404 in the preferred embodiment, for a particular output medium, when the input color is blue. Of course, in the preferred embodiment the color correction/ink limitation mappings are performed on input values of CMYK. However, FIG. 15A nevertheless is believed to be helpful in illustrating the effect of the ink limitation portion of the mapping for a single color.

In FIG. 15A, the horizontal axis represents various input intensity levels of the color blue and the vertical axis provides the output ink amounts for cyan and magenta. B_Cmax and B_Mmax are the amounts of cyan and magenta inks that will combine to produce the color blue and that will result in a total ink amount for low and high density cyan and low and high density magenta inks which is equal or approximately equal to the maximum absorption capacity of the output medium. It is noted that B_Cmax and B_Mmax are each less than 255.

It is also noted that the specific shape of FIG. 15A, as well as the exact values of B_Cmax and B_Mmax, will depend upon factors such as ink characteristics and the absorption characteristics of the output medium. Accordingly, FIG. 15A is illustrative only.

Returning now to FIG. 14, in step S1405 density separation, ink limitation and output correction are performed as described above for step S1105.

Figure 15B:
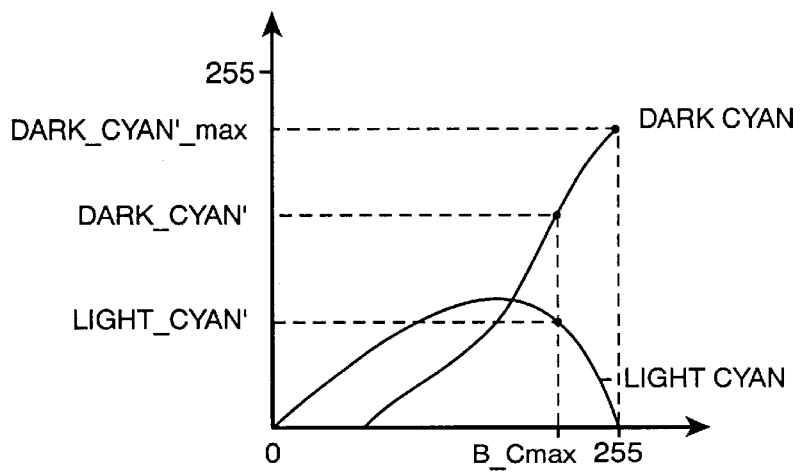
Figure 15C:
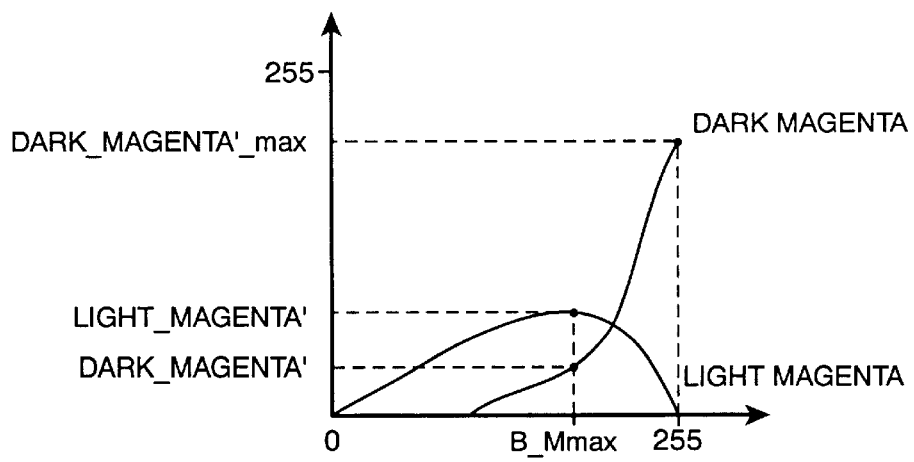

Continuing with the above example, FIGS. 15B and 15C illustrate the mappings in step S1405 for cyan and magenta, respectively. Thus, the mapping in FIG. 15B shows output cyan values corresponding to input cyan values up to 255. With an input cyan value of 255, the output cyan value will be Dark_Cyan'_max, which is less than or equal to 255. However, as mentioned above, in step S1404 the maximum value of cyan is limited to B_Cmax (B_Cmax<255) when the input color is blue. In step S1405, with an input value of B_Cmax the high density cyan ink amount output is Dark_Cyan' and the low density ink amount output is Light_Cyan'.

Similarly, with reference to FIG. 15C, in step S1404 the maximum value of magenta is limited to B_Mmax (B_Mmax<255) when the input color is blue. Thus in step S1405, with an input value of B_Mmax the high density magenta ink amount output is Dark_Magenta' and the low density magenta ink amount output is Light_Magenta'. It is noted that the maximum output of high density magenta ink amount (i.e., when the input magenta level is 255) is Dark_Magenta'_max, which is less than or equal to 255.

As mentioned above, B_Cmax and B_Mmax were selected in step S1404 so that Dark_Cyan'+Light_Cyan'+Dark_Magenta'+Light_Magenta' is less than or equal to the maximum absorption capacity of the output medium.

In other embodiments of the invention, droplet sizes can be separately varied for each ink. For instance, the printer/printer driver combination can be configured so as to permit independent selection of a small or large droplet for each of the eight different inks used. Similarly, other embodiments might permit more than two droplet sizes for each ink. In either case, B_Cmax and B_Mmax are selected so that the quantity Dark_Cyan'*Vol_DC+Light_Cyan'*Vol_LC+Dark_Magenta'*Vol_DM+Light_Magenta'*Vol_LM is less than or equal to the maximum absorption capacity of the output medium. In the foregoing, Vol_DC, Vol_LC, Vol_DM and Vol_LM correspond to droplet ink volumes for dark cyan, light cyan, dark magenta and light magenta, respectively. By maintaining the foregoing relationship, it is possible to change the droplet size for each ink (e.g., using CPU 70) and still avoid overflow of the ink droplets in most cases.

Returning again to FIG. 14, in step S1407 halftoning is performed, as described for step S1107 above.

Although the above-described example concerns a color produced using two inks (i.e., blue), the above-described ink limitation mapping similarly limits the total amount of all inks used to the maximum absorption capacity of the output medium for colors produced using three inks (e.g., process black). Thus, the foregoing embodiment of the invention often can provide appropriate ink limitation for colors produced using either one or more than one ink to be printed. Moreover, by utilizing two-stage ink limitation processing, the present invention often can achieve these results more efficiently than conventional techniques can permit.

As described above, the present invention performs density separation in multi-value color space and then separately performs halftone processing for each of the color/density planes. Accordingly, as compared with the conventional technique in which density separation is performed by multi-level halftoning, the technique according to the present invention generally is less susceptible to misalignment errors. That is, since halftoning is performed separately for each density plane, any misalignment effects are distributed more randomly than with multi-level halftoning. As a result, such effects are typically much less noticeable and can be compensated more easily.

Moreover, unlike the conventional method for multi-value density separation, the present invention generally does not require a separate step of ink adjustment after density separation to achieve good secondary color range.

Also, in the above embodiments of the invention density separation is performed after color correction. Accordingly, color correction processing is often easier to implement and more amenable to changing the number or densities of the inks used.

The invention has been described with respect to particular illustrative embodiments. However, it is to be understood that the invention is not limited to the above-described embodiments and that various changes and modifications may be made by those of ordinary skill in the art without departing from the spirit and the scope of the invention.

For instance, the invention has been described above with regard to an embodiment which uses two inks have different densities for each color. However, the invention is also applicable to multi-density printing in which three or more inks are used for each color. In this case, at least one of the lower density inks would be limited to less than its maximum potential value, and preferably to one-half of its maximum potential value. When using multi-density inks, the specific ink limitation amounts can be tailored based upon the desired range of secondary colors.

Similarly, multiple embodiments including different features are described above. However, it is to be understood that the features described in connection with each embodiment are not limited to that embodiment, but may be combined with various features from other embodiments, as understood by those skilled in the art. Similarly, two or more steps in the above-described embodiments may be combined into a single step and individual steps may be separated into two or more steps as understood by those skilled in the art.

What is claimed is:

1. A method for processing pixel data in digital color multi-density printing, comprising:
  a first mapping step of mapping a multi-value input intensity value for a color to be printed into a multi-value first quantity level for a first ink which is the color to be printed, the first ink having a first density;
  a second mapping step of mapping the input intensity value corresponding to the color to be printed into a multi-value second quantity level for a second ink which is the color to be printed, the second ink having a second density which is greater than the first density; and a generating step of generating a four-position binary dot pattern for the first and second inks based on the first and second quantity levels, wherein in said first mapping step, the first quantity level is limited to a value which would result in causing not more than two dots in the four-position binary dot pattern to be generated for the first ink.

2. A method according to claim 1, wherein the four-position binary dot pattern is a square grid, and wherein center-to-center spacing of dots on an edge of the square grid is 1/360 inch.

3. A method according to claim 1, wherein in said first mapping step, as the input intensity level increases, the first quantity level first increases to the value which would result in not more than two dots, and thereafter decreases.

4. A method according to claim 1, wherein said first mapping step and said second mapping step are performed using a look-up table.

5. A method according to claim 1, wherein the four-position binary dot pattern is generated using halftoning.

6. A method according to claim 5, wherein the four-position binary dot pattern is generated by halftoning a signal including the first quantity level and by separately halftoning a different signal including the second quantity level.

7. A method according to claim 1, wherein mappings used in said first and second mapping steps also perform corrections based on printer head characteristics.

8. A method according to claim 1, wherein said first and said second mapping steps are performed after all interdependent color processing has been performed.

9. A method for performing density separation and ink limitation in digital color multi-density printing, comprising:

converting a multi-value input intensity value into a multi-value first quantity level corresponding to a first ink having a first density and into a multi-value second quantity level corresponding to a second ink having a second density, wherein the first and second inks are a same color, wherein the second density is greater than the first density, and wherein a maximum value of the first quantity level is set to be less than a maximum value of the second quantity level.

10. A method according to claim 9, wherein the maximum value of the first quantity level is set to be approximately one-half of the maximum value of the second quantity level.

11. A method according to claim 9, wherein the maximum value of the first quantity level is set based upon how many inks having different densities but the same color are used.

12. A method according to claim 9, wherein said converting step is performed using a look-up table.

13. A method according to claim 9, wherein said converting step is performed after all interdependent color processing has been performed.

14. A method according to claim 9, wherein conversions in said converting step also correct for printer head characteristic variations.

15. A method according to claim 9, wherein the first quantity level increases as the input intensity value increases, until the maximum value of the first quantity level is reached, and thereafter decreases as the input intensity value increases.

16. A method according to claim 15, wherein the maximum value of the first quantity level is set to be approximately one-half of the maximum value of the second quantity level.

17. A method according to claim 15, wherein the maximum value of the first quantity level is set based upon how many inks having different densities but the same color are used.

18. A method for processing pixel data in digital color multi-density printing, comprising:

correcting input color component values based on output medium type, so as to obtain a multi-value corrected intensity value;

converting the multi-value corrected intensity value into a multi-value first quantity level corresponding to a first ink having a first density and into a multi-value second quantity level corresponding to a second ink having a second density, said converting step simultaneously correcting for printer head characteristics; and generating a binary dot pattern for the first and second inks based on the first and second quantity levels, wherein said correcting step is performed before said converting step, wherein the first and second inks have approximately a same color, wherein the second density is greater than the first density, and wherein a maximum value of the first quantity level is set to be approximately one-half of a maximum value of the second quantity value.

19. A method according to claim 18, wherein said converting step is performed using a look-up table.

20. A method according to claim 18, wherein the binary dot pattern is generated using halftoning.

21. A method for performing ink limitation in digital color multi-density printing, comprising:

performing a first correction on a first set of color components so as to generate a second set of color components;

extracting a third set of color components from the second set of color components, each component of the third set of color components corresponding to an ink used for printing; and performing a second correction on each component of the third set of color components, respectively, wherein the first correction includes a first ink limitation based on a combination of color components in the first set of color components, and wherein the second correction includes a second ink limitation in which ink limitation is performed separately for each color in the third set of color components.

22. A method according to claim 21, wherein each of the first, second and third sets of color components includes at least Y, M and C.

23. A method according to claim 21, wherein the first correction is based on a combination of a plurality of color components.

24. A method according to claim 21, wherein the second correction is separately performed for each of a plurality of color components, each of which corresponds to an ink to be printed, based of characteristics of the inks to be printed.

25. A method according to claim 21, wherein the first ink limitation is based on a combination of two inks.

26. A method according to claim 21, wherein the first ink limitation is based on a combination of three inks.

27. A method for performing density separation and ink limitation in digital color multi-density printing, comprising:

converting an input multi-value level into a multi-value first quantity level corresponding to a first ink having a first density and into a second quantity level corresponding to a second ink having a second density, wherein the first and second inks are a same color, wherein the conversion is performed by using a look-up table, and wherein the conversion effects ink limitation for each of the first and second inks, respectively, wherein the first quantity level is limited so as to obtain an increased range of the second quantity level.

28. A method according to claim 27, wherein said converting step converts each of a plurality of color components which correspond to a plurality of colored inks.

29. A method according to claim 28, further comprising a step of correcting the plurality of color components by performing a second ink limitation based on a combination of the plurality of colored inks.

30. A method according to claim 29, wherein the second ink limitation is based on a combination of two inks.

31. A method according to claim 29, wherein the second ink limitation is based on a combination of three inks.

32. A method for performing ink limitation in digital color multi-density printing, comprising:
   performing correction on a first set of color components based on a combination of a plurality of color components,
   wherein said correction includes ink limitation, wherein one color component is limited so as to obtain an increased range of another color component, said correction and ink limitation based on a combination of a plurality of inks.

33. A computer-readable memory medium in which computer-executable process steps are stored, the process steps for processing pixel data in digital color multi-density printing, wherein the process steps comprise:
   a first mapping step to map a multi-value input intensity value for a color to be printed into a multi-value first quantity level for a first ink which is the color to be printed, the first ink having a first density;
   a second mapping step to map the input intensity value corresponding to the color to be printed into a multi-value second quantity level for a second ink which is the color to be printed, the second ink having a second density which is greater than the first density; and
   a generating step to generate a four-position binary dot pattern for the first and second inks based on the first and second quantity levels,
   wherein in said first mapping step, the first quantity level is limited to a value which would result in causing not more than two dots in the four-position binary dot pattern to be generated for the first ink.

34. A computer-readable memory medium according to claim 33, wherein the four-position binary dot pattern is a square grid, and wherein center-to-center spacing of dots on an edge of the square grid is 1/360 inch.

35. A computer-readable memory medium according to claim 33, wherein in said first mapping step, as the input intensity level increases, the first quantity level first increases to the value which would result in not more than two dots, and thereafter decreases.

36. A computer-readable memory medium according to claim 33, wherein said first mapping step and said second mapping step are performed using a look-up table.

37. A computer-readable memory medium according to claim 33, wherein the four-position binary dot pattern is generated using halftoning.

38. A computer-readable memory medium according to claim 37, wherein the four-position binary dot pattern is generated by halftoning a signal including the first quantity level and by separately halftoning a different signal including the second quantity level.

39. A computer-readable memory medium according to claim 33, wherein mappings used in said first and second mapping steps also perform corrections based on printer head characteristics.

40. A computer-readable memory medium according to claim 33, wherein said first and said second mapping steps are performed after all interdependent color processing has been performed.

41. A computer-readable memory medium in which computer-executable process steps are stored, the process steps for performing density separation and ink limitation in digital color multi-density printing, wherein the process steps comprise:
   a converting step to a multi-value input intensity value into a multi-value first quantity level corresponding to a first ink having a first density and into a multi-value second quantity level corresponding to a second ink having a second density,
   wherein the first and second inks are a same color, wherein the second density is greater than the first density, and wherein a maximum value of the first quantity level is set to be less than a maximum value of the second quantity level.

42. A computer-readable memory medium according to claim 41, wherein the maximum value of the first quantity level is set to be approximately one-half of the maximum value of the second quantity level.

43. A computer-readable memory medium according to claim 41, wherein the maximum value of the first quantity level is set based upon how many inks having different densities but the same color are used.

44. A computer-readable memory medium according to claim 41, wherein said converting step is performed using a look-up table.

45. A computer-readable memory medium according to claim 41, wherein said converting step is performed after all interdependent color processing has been performed.

46. A computer-readable memory medium according to claim 41, wherein conversions in said converting step also correct for printer head characteristic variations.

47. A computer-readable memory medium according to claim 41, wherein the first quantity level increases as the input intensity value increases, until the maximum value of the first quantity level is reached, and thereafter decreases as the input intensity value increases.

48. A computer-readable memory medium according to claim 47, wherein the maximum value of the first quantity level is set to be approximately one-half of the maximum value of the second quantity level.

49. A computer-readable memory medium according to claim 47, wherein the maximum value of the first quantity level is set based upon how many inks having different densities but the same color are used.

50. A computer-readable memory medium in which computer-executable process steps are stored, the process steps for processing pixel data in digital color multi-density printing, wherein the process steps comprise:
   a correcting step to correct input color component values based on output medium type, so as to obtain a multi-value corrected intensity value;
   a converting step to convert the multi-value corrected intensity value into a multi-value first quantity level corresponding to a first ink having a first density and into a multi-value second quantity level corresponding to a second ink having a second density, said converting step simultaneously correcting for printer head characteristics; and
   a generating step to generate a binary dot pattern for the first and second inks based on the first and second quantity levels, wherein said correcting step is performed before said converting step, wherein the first and second inks have approximately a same color, wherein the second density is greater than the first density, and wherein a maximum value of the first quantity level is set to be approximately one-half of a maximum value of the second quantity value.

51. A computer-readable memory medium according to claim 50, wherein said converting step is performed using a look-up table.

52. A computer-readable memory medium according to claim 50, wherein the binary dot pattern is generated using halftoning.

53. A computer-readable memory medium in which computer-executable process steps are stored, the process steps for performing ink limitation in digital color multi-density printing, wherein the process steps comprise:
- a correction step to perform a first correction on a first set of color components so as to generate a second set of color components;
- an extracting step to extract a third set of color components from the second set of color components, each component of the third set of color components corresponding to an ink used for printing; and
- a second correction step to perform a second correction on each component of the third set of color components, respectively,
- wherein the first correction includes a first ink limitation based on a combination of color components in the first set of color components, and wherein the second correction includes a second ink limitation in which ink limitation is performed separately for each color in the third set of color components.

54. A computer-readable memory medium according to claim 53, wherein each of the first, second and third sets of color components includes at least Y, M and C.

55. A computer-readable memory medium according to claim 53, wherein the first correction is based on a combination of a plurality of color components.

56. A computer-readable memory medium according to claim 53, wherein the second correction is separately performed for each of a plurality of color components, each of which corresponds to an ink to be printed, based of characteristics of the inks to be printed.

57. A computer-readable memory medium according to claim 53, wherein the first ink limitation is based on a combination of two inks.

58. A computer-readable memory medium according to claim 53, wherein the first ink limitation is based on a combination of three inks.

59. A computer-readable memory medium in which computer-executable process steps are stored, the process steps for performing density separation and ink limitation in digital color multi-density printing, wherein the process steps comprise:
- a converting step to convert an input multi-value level into a multi-value first quantity level corresponding to a first ink having a first density and into a second quantity level corresponding to a second ink having a second density,
- wherein the first and second inks are a same color, wherein the conversion is performed by using a look-up table, and wherein the conversion effects ink limitation for each of the first and second inks, respectively, wherein the first quantity level is limited so as to obtain an increased range of the second quantity level.

60. A computer-readable memory medium according to claim 59, wherein said converting step converts each of a plurality of color components which correspond to a plurality of colored inks.

61. A computer-readable memory medium according to claim 60, wherein said process step further comprise a step to correct the plurality of color components by performing a second ink limitation based on a combination of the plurality of colored inks.

62. A computer-readable memory medium according to claim 61, wherein the second ink limitation is based on a combination of two inks.

63. A computer-readable memory medium according to claim 61, wherein the second ink limitation is based on a combination of three inks.

64. An apparatus for performing ink limitation in digital color multi-density printing, comprising:
- a memory for storing color image data and computer executable process steps; and
- a processor for executing the process steps stored in said memory;
- wherein said process steps include a step to perform correction on a first set of color components based on a combination of a plurality of color components, wherein said correction includes ink limitation, wherein one color component is limited so as to obtain an increased range of another color component, said correction and ink limitation based on a combination of a plurality of inks.

65. An apparatus for processing pixel data in digital color multi-density printing, comprising:
- a memory for storing computer executable process steps; and
- a processor for executing the process steps stored in said memory;
- wherein said process steps include (1) a first mapping step to map a multi-value input intensity value for a color to be printed into a multi-value first quantity level for a first ink which is the color to be printed, the first ink having a first density; (2) a second mapping step to map the input intensity value corresponding to the color to be printed into a multi-value second quantity level for a second ink which is the color to be printed, the second ink having a second density which is greater than the first density; and (3) a generating step to generate a four-position binary dot pattern for the first and second inks based on the first and second quantity levels,
- wherein in said first mapping step, the first quantity level is limited to a value which would result in causing not more than two dots in the four-position binary dot pattern to be generated for the first ink.

66. An apparatus according to claim 65, wherein the four-position binary dot pattern is a square grid, and wherein center-to-center spacing of dots on an edge of the square grid is 1/360 inch.

67. An apparatus according to claim 65, wherein in said first mapping step, as the input intensity level increases, the first quantity level first increases to the value which would result in not more than two dots, and thereafter decreases.

68. An apparatus according to claim 65, wherein said first mapping step and said second mapping step are performed using a look-up table.

69. An apparatus according to claim 65, wherein the four-position binary dot pattern is generated using halftoning.

70. An apparatus according to claim 69, wherein the four-position binary dot pattern is generated by halftoning a signal including the first quantity level and by separately halftoning a different signal including the second quantity level.

71. An apparatus according to claim 65, wherein mappings used in said first and second mapping steps also perform corrections based on printer head characteristics.

72. An apparatus according to claim 65, wherein said first and said second mapping steps are performed after all interdependent color processing has been performed.

73. An apparatus for performing density separation and ink limitation in digital color multi-density printing, comprising:
- a memory for storing computer executable process steps; and
- a processor for executing the process steps stored in said memory,
- wherein said process steps include steps to convert a multi-value input intensity value into a multi-value first quantity level corresponding to a first ink having a first density and into a multi-value second quantity level corresponding to a second ink having a second density,
- wherein the first and second inks are a same color, wherein the second density is greater than the first density, and wherein a maximum value of the first quantity level is set to be less than a maximum value of the second quantity level.

74. An apparatus according to claim 73, wherein the maximum value of the first quantity level is set to be approximately one-half of the maximum value of the second quantity level.

75. An apparatus according to claim 73, wherein the maximum value of the first quantity level is set based upon how many inks having different densities but the same color are used.

76. An apparatus according to claim 73, wherein said converting step is performed using a look-up table.

77. An apparatus according to claim 73, wherein said converting step is performed after all interdependent color processing has been performed.

78. An apparatus according to claim 73, wherein conversions in said converting step also correct for printer head characteristic variations.

79. An apparatus according to claim 73, wherein the first quantity level increases as the input intensity value increases, until the maximum value of the first quantity level is reached, and thereafter decreases as the input intensity value increases.

80. An apparatus according to claim 79, wherein the maximum value of the first quantity level is set to be approximately one-half of the maximum value of the second quantity level.

81. An apparatus according to claim 79, wherein the maximum value of the first quantity level is set based upon how many inks having different densities but the same color are used.

82. An apparatus for processing pixel data in digital color multi-density printing, comprising:
- a memory for storing computer executable process steps; and
- a processor for executing the process steps stored in said memory;
- wherein said process steps include steps to correct input color component values based on output medium type, so as to obtain a multi-value corrected intensity value; convert the multi-value corrected intensity value into a multi-value first quantity level corresponding to a first ink having a first density and into a multi-value second quantity level corresponding to a second ink having a second density, said converting step simultaneously correcting for printer head characteristics; and generate a binary dot pattern for the first and second inks based on the first and second quantity levels,
- wherein said correcting step is performed before said converting step, wherein the first and second inks have approximately a same color, wherein the second density is greater than the first density, and wherein a maximum value of the first quantity level is set to be approximately one-half of a maximum value of the second quantity value.

83. An apparatus according to claim 82, wherein said converting step is performed using a look-up table.

84. An apparatus according to claim 82, wherein the binary dot pattern is generated using halftoning.

85. An apparatus for performing ink limitation in digital color multi-density printing, comprising:
- a memory for storing computer executable process steps; and
- a processor for executing the process steps stored in said memory;
- wherein said process steps include steps to perform a first correction on a first set of color components so as to generate a second set of color components; extract a third set of color components from the second set of color components, each component of the third set of color components corresponding to an ink used for printing; and perform a second correction on each component of the third set of color components, respectively,
- wherein the first correction includes a first ink limitation based on a combination of color components in the first set of color components, and wherein the second correction includes a second ink limitation in which ink limitation is performed separately for each color in the third set of color components.

86. An apparatus according to claim 85, wherein each of the first, second and third sets of color components includes at least Y, M and C.

87. An apparatus according to claim 85, wherein the first correction is based on a combination of a plurality of color components.

88. An apparatus according to claim 85, wherein the second correction is separately performed for each of a plurality of color components, each of which corresponds to an ink to be printed, based of characteristics of the inks to be printed.

89. An apparatus according to claim 85, wherein the first ink limitation is based on a combination of two inks.

90. An apparatus according to claim 85, wherein the first ink limitation is based on a combination of three inks.

91. An apparatus for performing density separation and ink limitation in digital color multi-density printing, comprising:
- a memory for storing computer executable process steps; and
- a processor for executing the process steps stored in said memory;
- wherein said process steps include steps to convert an input multi-value level into a multi-value first quantity level corresponding to a first ink having a first density and into a second quantity level corresponding to a second ink having a second density,
- wherein the first and second inks are a same color, wherein the conversion is performed by using a look-up table, and wherein the conversion effects ink limitation for each of the first and second inks, respectively, wherein the first quantity level is limited so as to obtain an increased range of the second quantity level.

92. An apparatus according to claim 91, wherein said converting step converts each of a plurality of color components which correspond to a plurality of colored inks.

93. An apparatus according to claim 92, wherein said process steps further comprise a step to correct the plurality of color components by performing a second ink limitation based on a combination of the plurality of colored inks.

94. An apparatus according to claim 93, wherein the second ink limitation is based on a combination of two inks.

95. An apparatus according to claim 93, wherein the second ink limitation is based on a combination of three inks.

96. An apparatus for performing ink limitation in digital color multi-density printing, comprising:

a memory for storing computer executable process steps; and a processor for executing the process steps stored in said memory;

wherein said process steps include steps to perform correction on a first set of color components based on a combination of a plurality of color components, and wherein said correction includes ink limitation, wherein one color component is limited so as to obtain an increased range of another color component, said correction and ink limitation based on a combination of a plurality of inks.

97. A method for performing density separation and ink limitation in digital color multi-density printing, comprising:

converting an input multi-value level into a multi-value first quantity level corresponding to a first ink having a first density and into a second quantity level corresponding to a second ink having a second density, wherein the first and second inks are a same color, wherein the conversion is performed by using a look-up table, wherein the conversion effects ink limitation for each of the first and second inks, respectively, and wherein said converting step converts each of a plurality of color components which correspond to a plurality of colored inks; and correcting the plurality of color components by performing a second ink limitation based on a combination of the plurality of colored inks.

98. A method according to claim 97, wherein the second ink limitation is based on a combination of two inks.

99. A method according to claim 97, wherein the second ink limitation is based on a combination of three inks.

100. An apparatus for performing density separation and ink limitation in digital color multi-density printing, comprising:

a memory for storing computer executable process steps; and a processor for executing the process steps stored in said memory;

wherein said process steps include steps (1) to convert an input multi-value level into a multi-value first quantity level corresponding to a first ink having a first density and into a second quantity level corresponding to a second ink having a second density, wherein the first and second inks are a same color, wherein the conversion is performed by using a look-up table, wherein the conversion effects ink limitation for each of the first and second inks, respectively, and wherein said converting step converts each of a plurality of color components which correspond to a plurality of colored inks, and (2) to correct the plurality of color components by performing a second ink limitation based on a combination of the plurality of colored inks.

101. An apparatus according to claim 100, wherein the second ink limitation is based on a combination of two inks.

102. An apparatus according to claim 100, wherein the second ink limitation is based on a combination of three inks.

* * * * *

UNITED STATES PATENT AND TRADEMARK OFFICE
CERTIFICATE OF CORRECTION

PATENT NO.   : 6,268,931 B1
DATED        : July 31, 2001
INVENTOR(S)  : Akitoshi Yamada et al.

It is certified that error appears in the above-identified patent and that said Letters Patent is hereby corrected as shown below:

Column 2,
Line 15, "specifically," should read -- Specifically, --.
Line 30, "ulti-value" should read -- multi-value --.

Column 7,
Line 1, "Value" should read -- value --.

Column 11,
Line 9, "that" should read -- than --.

Column 16,
Line 55, "of" (first occurrence) should read -- on --.

Column 19,
Line 43, "of" should read -- on --.

Column 22,
Line 47, "of" (first occurrence) should read -- on --.

Signed and Sealed this

Thirty-first Day of December, 2002

JAMES E. ROGAN
*Director of the United States Patent and Trademark Office*